US011681029B2

(12) United States Patent
Subasingha et al.

(10) Patent No.: US 11,681,029 B2
(45) Date of Patent: Jun. 20, 2023

(54) DETECTING A LASER PULSE EDGE FOR REAL TIME DETECTION

(71) Applicant: Zoox, Inc., Foster City, CA (US)

(72) Inventors: Subasingha Shaminda Subasingha, San Ramon, CA (US); Riley Andrews, San Francisco, CA (US); Turhan Karadeniz, Oakland, CA (US); Ravi Sankar Mahankali, Fremont, CA (US)

(73) Assignee: Zoox, Inc., Foster City, CA (US)

( * ) Notice: Subject to any disclaimer, the term of this patent is extended or adjusted under 35 U.S.C. 154(b) by 396 days.

(21) Appl. No.: 17/092,162

(22) Filed: Nov. 6, 2020

(65) Prior Publication Data

US 2021/0239806 A1 Aug. 5, 2021

Related U.S. Application Data

(63) Continuation of application No. 15/925,764, filed on Mar. 20, 2018, now Pat. No. 10,830,880.

(51) Int. Cl.
*G01S 7/48* (2006.01)
*G01S 7/4865* (2020.01)
*G01S 7/487* (2006.01)
*G01S 7/4863* (2020.01)

(52) U.S. Cl.
CPC .......... *G01S 7/4866* (2013.01); *G01S 7/4873* (2013.01); *G01S 7/4863* (2013.01)

(58) Field of Classification Search
USPC ....................................................... 356/5.01
See application file for complete search history.

(56) References Cited

U.S. PATENT DOCUMENTS

| 6,650,404 | B1 | 11/2003 | Crawford |
| 7,245,893 | B1 | 7/2007 | Husted et al. |
| 7,554,652 | B1 | 6/2009 | Babin et al. |

(Continued)

FOREIGN PATENT DOCUMENTS

| CA | 2742687 | 5/2010 |
| DE | 102009057104 A1 | 6/2011 |

(Continued)

OTHER PUBLICATIONS

Extended European Search Report dated Feb. 10, 2022 for European Patent Application No. 19771589.9, 13 pages.

(Continued)

*Primary Examiner* — James R Hulka
(74) *Attorney, Agent, or Firm* — Lee & Hayes, P.C.

(57) ABSTRACT

A time delay of arrival (TDOA) between a time that a light pulse was emitted to a time that a pulse reflected off an object was received at a light sensor may be determined for saturated signals by using an edge of the saturated signal, rather than a peak of the signal, for the TDOA calculation. The edge of the saturated signal may be accurately estimated by fitting a first polynomial curve to data points of the saturated signal, defining an intermediate magnitude threshold based on the polynomial curve, fitting a second polynomial curve to data points near an intersection of the first polynomial curve and the intermediate threshold, and identifying an intersection of the second polynomial curve and the intermediate threshold as the rising edge of the saturated signal.

20 Claims, 11 Drawing Sheets

(56) References Cited

U.S. PATENT DOCUMENTS

| | | |
|---|---|---|
| 7,969,558 B2 | 6/2011 | Hall |
| 8,354,928 B2 | 1/2013 | Morcom |
| 8,577,538 B2 | 11/2013 | Lenser et al. |
| 8,675,181 B2 | 3/2014 | Hall |
| 8,767,190 B2 | 7/2014 | Hall |
| 9,091,754 B2 | 7/2015 | d'Aligny |
| RE46,672 E | 1/2018 | Hall |
| 10,585,175 B2 | 3/2020 | Retterath et al. |
| 10,768,281 B2 * | 9/2020 | Subasingha ............ G01S 7/4868 |
| 10,830,880 B2 * | 11/2020 | Subasingha ............ G01S 7/4865 |
| 10,830,881 B2 * | 11/2020 | Subasingha ............ G01S 7/4868 |
| 2002/0018198 A1 | 2/2002 | Pierenkemper |
| 2008/0027591 A1 | 1/2008 | Lenser et al. |
| 2010/0020306 A1 | 1/2010 | Hall |
| 2010/0097216 A1 | 4/2010 | Morcom |
| 2010/0302528 A1 | 12/2010 | Hall |
| 2011/0216304 A1 | 9/2011 | Hall |
| 2011/0313722 A1 | 12/2011 | Zhu et al. |
| 2012/0320363 A1 | 12/2012 | Goodman |
| 2013/0050676 A1 | 2/2013 | d'Aligny |
| 2014/0085134 A1 | 3/2014 | Takaki |
| 2016/0356881 A1 | 12/2016 | Retterath et al. |
| 2017/0153319 A1 | 6/2017 | Villeneuve et al. |
| 2017/0155225 A1 | 6/2017 | Villeneuve et al. |
| 2018/0024241 A1 | 1/2018 | Eichenholz et al. |
| 2018/0120433 A1 | 5/2018 | Eichenholz et al. |
| 2018/0149753 A1 | 5/2018 | Shin et al. |
| 2018/0284226 A1 | 10/2018 | LaChapelle et al. |
| 2019/0056497 A1 | 2/2019 | Pacala et al. |
| 2019/0293768 A1 | 9/2019 | Subasingha et al. |
| 2019/0293769 A1 | 9/2019 | Subasingha et al. |
| 2019/0293770 A1 | 9/2019 | Subasingha et al. |
| 2019/0353478 A1 | 11/2019 | Deng et al. |

FOREIGN PATENT DOCUMENTS

| | | |
|---|---|---|
| DE | 102012211222 A1 | 1/2013 |
| EP | 0971242 A1 | 1/2000 |
| EP | 2182378 A1 | 5/2010 |
| JP | H0552956 A | 3/1993 |
| JP | H06109841 A | 4/1994 |
| JP | H0772237 A | 3/1995 |
| JP | H1138136 A | 2/1999 |
| JP | H11125676 A | 5/1999 |
| JP | 2004157044 A | 6/2004 |
| JP | 2007132951 A | 5/2007 |
| JP | 2007147332 A | 6/2007 |
| JP | 2008267920 A | 11/2008 |
| JP | 2011215005 A | 10/2011 |
| JP | 2012021896 A | 2/2012 |
| JP | 2012108121 A | 6/2012 |
| JP | 2013096742 A | 5/2013 |
| JP | 2013545098 A | 12/2013 |
| JP | 2014137374 A | 7/2014 |
| JP | 2017161279 A | 9/2017 |

OTHER PUBLICATIONS

Gnecchi et al., "A 1×16 SiPM Array for Automotive 3D Imaging LiDAR Systems", Proceedings of the 2017 International Image SensorWorkshop (IISW), 2017, pp. 133-136.

Non Final Office Action dated May 13, 2020 for U.S. Appl. No. 15/925,764 "Selecting LiDAR Pulse Detector Depending on Pulse Type" Subasingha, 10 pages.

Non Final Office Action dated May 13, 2020 for U.S. Appl. No. 15/925,770 "Active Signal Detection Using Adaptive Identification of a Noise Floor" Subasingha, 8 pages.

PCT Search Report and Written Opinion dated Jul. 4, 2019 for PCT Application No. PCT/US2019/023254, 8 pages.

PCT Search Report and Written Opinion dated Jul. 4, 2019 for PCT Application No. PCT/US2019/023230.

PCT Search Report and Written Opinion dated Jul. 4, 2019 for PCT Application No. PCT/US2019/023247, 7 pages.

Sun et al., "ICESat/GLAS Altimetry Measurements: Received Signal Dynamic Range and Saturation Correction", vol. 55, No. 10, Oct. 2017, 36 pages.

Japanese Office Action dated Jan. 24, 2023 for Japanese Patent Application No. 2020-550790, a foreign counterpart to U.S. Pat. No. 10,830,880, 16 pages.

Japanese Office Action dated Jan. 31, 2023 for Japanese Patent Application No. 2020-550815, a foreign counterpart to U.S. Pat. No. 10,768,281, 7 pages.

Japanese Office Action dated Feb. 7, 2023 for Japanese Patent Application No. 2020-550878, a foreign counterpart to U.S. Pat. No. 10,830,881, 13 pages.

Extended European Search Report dated Oct. 22, 2021 for European Patent Application No. 19771818.2, 9 pages.

Extended European Search Report dated Oct. 29, 2021 for European Patent Application No. 19771597.2, 7 pages.

Partial European Search Report dated Oct. 29, 2021 for European Patent Application No. 19771589.9, 9 pages.

* cited by examiner

DETECTING A LASER PULSE EDGE FOR REAL TIME DETECTION

RELATED APPLICATIONS

This application claims priority to U.S. patent application Ser. No. 15/925,764, filed Mar. 20, 2018, which is incorporated herein by reference.

BACKGROUND

Light detection and ranging or "LIDAR" refers to a technique for measuring distances to visible surfaces by emitting light and measuring properties of the reflections of the light. A LIDAR system has a light emitter and a light sensor. The light emitter may comprise a laser that directs light into an environment. When the emitted light is incident on a surface, a portion of the light is reflected and received by the light sensor, which converts light intensity to a corresponding electrical signal.

A LIDAR system has signal processing components that analyze reflected light signals to determine the distances to surfaces from which the emitted laser light has been reflected. For example, the system may measure the propagation time of a light signal as it travels from the laser emitter, to the surface, and back to the light sensor. A distance is then calculated based on the flight time and the known speed of light.

Distortions of the reflected light signal caused by a variety of factors may cause traditional LIDAR systems to inaccurately determine a time at which the reflected light returns to the light sensor. For example, a one nanosecond variation in the return signal time may correspond to a change in the estimated distance of roughly 15 centimeters. Some of the factors that can cause distortions of the reflected light signal may include highly reflective surfaces, surfaces that are very close to the LIDAR unit, etc.

Since thousands, or even millions, of measurements may be made every second by a LIDAR system, it is not easy to detect the existence of such small variations in return signal time of reflected light signals. In many cases, discovering this problem is made more difficult by the fact that the variations in return time of reflected light signals simply go undetected. The LIDAR system detects the delayed return and inaccurately gauges the distance to the object.

Moreover, in some high-noise or low-noise conditions, discriminating a return signal from noise may be difficult. For example, sunny conditions may create a strong noise power band that can obscure the return signal. Conventional LIDAR systems set a threshold and filter out any signals below the threshold. This effectively filters out the noise, but also filters out weaker returns falling under the threshold. Additionally, since the strength of return signals is lower for more distant objects, setting a high threshold effectively reduces the range of the LIDAR system.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
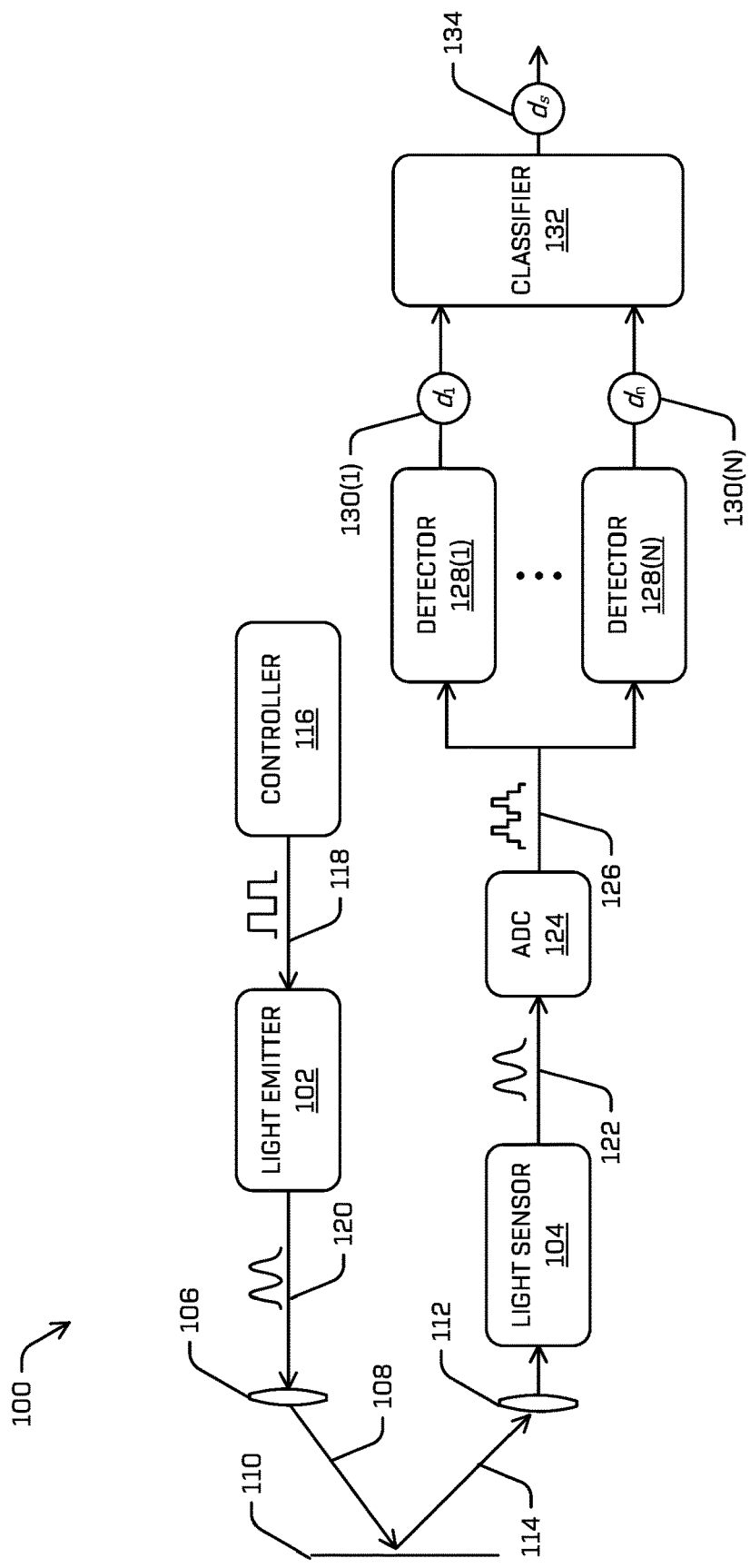
FIG. 1 illustrates a block diagram of components that may be used in a LIDAR channel of an example LIDAR system.

A LIDAR system typically has at least one light emitter and a corresponding light sensor, where a pair of a light emitter and a light sensor is commonly referred to as a channel. The light emitter may include a laser such as an injection laser diode (ILD) that directs highly coherent light in the direction of an object or surface. The light sensor may include a photodetector such as a photomultiplier or avalanche photodiode (APD) that converts light intensity at the light sensor to a corresponding electrical signal. Optical elements such as lenses or mirrors may be used in the light transmission and reception paths to focus and direct light.

Some LIDAR devices can measure the distances of multiple surface points within a scene. For each surface point, the LIDAR system can determine both the distance of the surface point and its angular direction with respect to the device. This capability can be used to create a point cloud including three-dimensional coordinates of the multiple surface points.

However, highly reflective objects, objects that are spatially close to the LIDAR device, temperatures of the light sensor, non-linearities of the light emitter and/or light sensor, among other factors may cause distortions in the electrical signal generated by the light sensor when the light sensor detects a return signal. Since this return signal is used for measuring the distance to a surface of an object and since a mere nanosecond horizontal shift in the return signal may correspond to a difference in the distance measurement of approximately 15 centimeters, these disturbances may greatly reduce the accuracy of a traditional LIDAR device. In some examples, it may be desirable to achieve an accuracy of 5 centimeters or less, which requires being able to accurately ascertain a time at which a return signal is received down to a third of a nanosecond or less.

For example, a light emitter may emit a light pulse that reflects off a highly reflective object such as a retroreflector, street sign, or mirror. When this light pulse is received at the light sensor, the intensity of the light received at the sensor caused by the reflectivity (or proximity) of the object may exceed an ability of the light sensor to generate an electrical signal that scales with the intensity of pulse. In other words, the intensity of the reflected light pulse corresponds to a higher electrical signal value than the light sensor is able to produce. In some examples, the electrical signal generated by the light sensor may be converted by an analog-to-digital converter (ADC) into a digital signal. To make matters worse, the electrical signal generated by the light sensor may, in some cases, exceed a maximum dynamic range of the ADC so that, similarly to light sensor issue, the digital signal produced by the ADC does not reflect a high enough magnitude of the light sensor to correspond with the electrical signal produced by the light sensor. This type of signal may be referred to as a "saturated signal" e.g., where a return signal magnitude is capped by the maximum capabilities of the light sensor and/or the ADC. In some examples, the occurrence of saturated signals may be decreased by reducing the light emission power and/or scaling the ADC's output. However, in some examples, this is still not sufficient to prevent receiving a saturated signal.

Saturated signals decrease the accuracy of some methods for determining a delay between emission of the light pulse and reception of the light pulse because a time corresponding to a peak of the return pulse cannot be directly measured since the peak is truncated. For example, some methods include cross-correlating a peak of the return signal with a peak of a reference signal. When the return signal is saturated, the time corresponding to a peak of the signal cannot be ascertained trivially and cross-correlating saturated signals with a reference signal results in erroneous delay determinations, which, in turn, cause the distance determined from the delay to also be erroneous.

The techniques (e.g., machines, programs, processes) discussed herein enhance the accuracy of determining a delay (e.g., a time delay of arrival (TDOA)) between emitting a light pulse and receiving the reflected light pulse at a light sensor by, for example, classifying a type of the return signal as saturated or unsaturated and choosing, based, at least in part, on the type, an output of one detector of a plurality of detectors to output as the estimated distance. In some examples, classifying a type of the return signal may include determining a height (i.e., indication of magnitude, used equivalently with the term "magnitude" herein) of the return signal, a width of the return signal, and/or whether one or more samples of the return signal exceed a threshold magnitude for a predetermined number of samples (e.g., a sequential number of samples). In this way, accuracy of a distance determined from the delay can be improved. When these distances are used to control an autonomous vehicle, enhancing the accuracy of detecting the time that a light pulse is reflected onto a light detector may be life-saving. Not only do these techniques improve safety of autonomous vehicles, they may improve the accuracy of robotic movements and/or three-dimensional maps generated from the LIDAR data.

In some examples, a LIDAR device may include multiple detectors that, in some examples, may receive the received signal substantially simultaneously (i.e., within technical tolerances of being received simultaneously), from which one or more of the multiple detectors may generate an output. A classifier may classify the received signal as a particular type (e.g., saturated or not saturated) and may select, based, at least in part, on the type, one of the outputs of the one or more detectors to be output by the LIDAR device as the distance measurement. In another example, the classifier may select the detector, based, at least in part, on the type, and the received signal may then be provided to the detector for the detector to generate an output.

In some examples, the multiple detectors may include an unsaturated signal detector that determines a TDOA based, at least in part, on correlating the received signal with a reference signal. The multiple detectors may additionally or alternatively include a saturated signal detector that determines a TDOA based, at least in part, on detecting a rising edge of the received signal. In some examples, the multiple detectors may include additional detectors that may determine a TDOA, discriminate an active signal from noise, or other properties of the signal using a variety of techniques. For example, the multiple detectors may include a cross-correlation detector, a front edge detector, a deconvolution detector, a frequency domain analysis detector, etc. In some examples, active signal discrimination may be conducted by the classifier.

The techniques discussed herein may also discriminate an active return signal (e.g., a portion of the electrical signal generated by the light sensor that corresponds to the return signal) from mere noise. For example, the techniques discussed herein may include determining a dynamic noise floor for identifying an active return signal. That is, the noise floor may be adjusted dynamically based on properties of the received signal. For example, the noise floor may be adjusted based, at least in part, on a moving average of the received signal. In some examples, the techniques may include identifying, as an active pulse, samples of the received signal that are associated with magnitudes that exceed the dynamic noise floor. In an additional or alternate example, an active pulse may be identified from a threshold number of sequential samples that exceed the dynamic noise floor (e.g., 3 samples in a row that exceed the dynamic noise floor). In some examples, the dynamic noise floor may be scaled and/or shifted based, at least in part, on additional properties of the received signal (e.g., a height and/or width of the received signal). Raising the dynamic noise floor during periods of greater noise (e.g., in bright sunlight) reduces false positive identifications of noise being detected as an active return signal and false negatives of an active return signal not being identified as such, thereby improving the accuracy of LIDAR distance measurements and improving the safety and accuracy of machines that rely on the distance measurements (e.g., autonomous vehicles, robotic appendages). By dynamically lowering the noise floor during periods of low noise (e.g., at night) LIDAR system is able to discriminate lower intensity active return signals and thereby improve a range of the LIDAR system.

Example Lidar System

FIG. 1 illustrates a block diagram of components of an example LIDAR system 100 that may be used to perform distance measurements.

In some examples, the example LIDAR system 100 may include a channel that includes a light emitter 102 and a corresponding light sensor 104. A channel is used to emit a laser light pulse and to measure properties of the reflections of the pulse, as explained below. FIG. 1 depicts a single measurement channel (e.g., light emitter/light sensor pair), although it is contemplated that the example LIDAR system 100 may include multiple channels. One skilled in the art would understand that the light emitters and light sensors may be multiplied in number beyond the single laser emitter and light sensor depicted. The term "channel" may also encompass supporting circuitry that is associated with the emitter/sensor pair and at least some of the supporting circuitry may be shared among multiple channels (e.g., ADC, detector(s), classifier).

In some examples, the light emitter 102 may include a laser emitter that produces light of a wavelength between 600 and 1000 nanometers. In additional or alternate examples, the wavelength of emitted light may range between 10 micrometers to 250 nm. The light emitter 102 may emit light pulses (e.g., laser pulses) that vary in power and/or wavelength. For example, some of the laser emitters of the example light LIDAR system 100 may emit light at a 905 nanometers, and others of the laser emitters may emit light at 1064 nanometers. The laser emitters of the different wavelengths can then be used alternately, so that the emitted light alternates between 905 nanometers and 1064 nanometers. The light sensors can be similarly configured to be sensitive to the respective wavelengths and to filter other wavelengths.

Activating or turning on the emitter may be referred to as "firing" the emitter. In some examples, the light emitter 102 may be fired to create a light pulse having a short duration. Moreover, to conserve power, the LIDAR system 100 may decrease the power of the emitted light pulse based, at least in part, on detected conditions of the environment into which the light pulse is to be emitted (e.g., low light/low noise conditions).

For a single distance measurement, the laser emitter 102 may be controlled to emit a burst of laser light pulses (i.e. one or more) through a lens 106 along an outward path 108. The burst is reflected by a surface 110 of an environment surrounding the LIDAR, through the lens 112, and to the light sensor 104 along a return path 114. In some examples, the LIDAR may include multiple laser emitters positioned within a chassis to project laser light outward through the one or more lenses. In some examples, the LIDAR may also include multiple light sensors so that light from any particular emitter is reflected through the one or more lenses to a corresponding light sensor.

In some examples, the lens 106 and the lens 112 are the same lens, depicted redundantly for clarity. In other examples, the lens 112 is a second lens designed so that beams from laser emitters 102 at different physical positions within a housing of the LIDAR are directed outwardly at different angles. Specifically, the first lens 106 is designed to direct light from the laser emitter 102 of a particular channel in a corresponding and unique direction. The second lens 112 is designed so that the corresponding light sensor 202 of the channel receives reflected light from the same direction.

In some examples, the laser emitter 102 may be controlled by a controller 116 that implements control and analysis logic for multiple channels. The controller 116 may be implemented in part by a field-programmable gate array ("FPGA"), a microprocessor, a digital signal processor ("DSP"), or a combination of one or more of these and/or other control and processing elements, and may have associated memory for storing associated programs and data. To initiate a single distance measurement using a single channel, the controller 116 may generate a trigger signal. The trigger signal may be received by a pulse generator, which may generate a burst signal 118 responsive to the trigger signal. In some examples, the burst signal 118 may include a pair of sequential pulses that indicate the times at which the laser emitter 102 should be activated or turned on. In some examples, the rising edges of the pulses may be used to indicate the times at which the laser emitter 102 should be activated (fired), though any other feature of the burst signal 118 is contemplated to activate the laser emitter 102 (e.g., a falling edge). In some examples, the pulse generator may be part of the controller 116.

The burst signal 118 may be received by the light emitter 102 and cause the light emitter 102 to emit a pair of sequential pulses of laser light in an implementation where the burst signal 118 includes a pair of sequential pulses 120. The light emitter 102 may emit the light 120 corresponding in time to the pulses of the burst signal 118. Though depicted in FIG. 1 as two pulses for illustrative purposes, any number of pulses (e.g. one or more) is contemplated. In some examples, the trigger signal, the burst signal 118, and/or a signal generated by the light emitter 102 may be used to determine the TDOA. For example, a time corresponding to the emission of the light may be recorded (e.g., a sample number of a clock signals generated by the controller 116) based on one or more of these signals. This time may be used by subsequent components (e.g., the detectors and/or the classifier) to determine the TDOA.

Assuming that the emitted laser light is reflected from the surface 110 of an object, the light sensor 104 may receive the reflected light and produces a return signal 122 (or a light sensor output signal). The return signal 122 may generally be of the same shape as the light pulse 120 emitted by the light emitter 102, although it may differ to some extent as a result of noise, interference, cross-talk between different emitter/sensor pairs, interfering signals from other LIDAR devices, and so forth. The return signal 122 will also be delayed with respect to the light pulse 120 by an amount corresponding to the round-trip propagation time of the emitted laser burst.

In some examples, the light sensor 104 may include an avalanche photodiode ("APD") and/or any other suitable component for generating a signal based on light detected at the light sensor 104. In some examples, the light sensor 104 may further include an amplifier, which may include a current-to-voltage converter amplifier such as, for example, a transimpedance amplifier ("TIA"). Regardless, the amplifier may be any amplifier configured to transform the return signal so that downstream components, such as an ADC, that read the signal can do so accurately.

In some examples, an ADC 124 may receive and digitize the return signal 122 when to produce a received signal 126. The received signal 126 may include a stream of digital values indicating the magnitude of the return signal 122 over time. In some examples, the ADC 124 may be programmed to sample the return signal 126 at a frequency that matches a clock signal generated by the controller 116 to simplify determining the TDOA. As used herein, a "sample" of the received signal 126 includes a representation of a magnitude of the return signal 122 at a discrete sample number. These discrete sample numbers may be associated with an analog time that may be used for determining the TDOA (e.g., by referring to the sample frequency to determine a delay time).

The representation of the magnitude for a discrete sample may be based, at least in part, on a scale of the ADC 124. For example, the ADC 126 may have a 16-bit output and may therefore represent the a current or voltage of the return signal 122 as a 16-bit value. The top-most value of the output of the ADC 124 may be referred to as a maximum dynamic range of the ADC 124. In some examples, the scale of the ADC 124 may be set based, at least in part, on a power of the emitted light 120 and/or detected environmental conditions (e.g., a signal-to-noise (SNR) ratio, noise floor). However, highly reflective surfaces and/or surfaces that are very close to the light emitter/light sensor, may reflect more light onto the light sensor 104 than was anticipated so that the light sensor 104 outputs a return signal 122 that exceeds the maximum dynamic range of the ADC 124. In other words, in this situation, the ADC 124 would output a maximum possible value (e.g., for a 16-bit unsigned integer output "65535"), but this value would not be "high enough" to accurately reflect the return signal 122 and/or the received signal cannot be resolved by the ADC because the range between the noise floor and the received signal is not high enough. In additional or alternate examples, the light reflected by the object onto the light sensor 104 may similarly exceed an ability of the light sensor 104 to produce a current or voltage that accurately reflects the intensity of the light received at the light sensor 104.

These conditions are referred to herein as "saturation" of the light sensor 104 and the ADC 124. Regardless of whether one or both of the light sensor 104 or the ADC 124 are saturated in a manner as described above, the received signal 126 produce by saturation of the light sensor 104 and/or the ADC 124 may be referred to as a saturated signal.

In some examples, detector(s) 128(1)-(N) receive the received signal 126 and determine distances, $d_1 \ldots d_n$ (130(1)-(N)), therefrom. For example, detector 128(1) may receive the received signal 126 and may determine distance 130(1) based, at least in part, on the received signal 126 based on a programming and/or circuit layout of the detector. In some examples, the detector(s) 128(1)-(N) may additionally or alternatively receive a clock signal from the controller 116, an indication of the time at which the light pulse 120 was emitted by the light emitter 102, and/or any other indication sufficient to determine a TDOA from which the detector may calculate the distance (e.g., light sensor temperature, light emission power).

For example, the detector(s) 128(1)-(N) may include a detector for determining a TDOA for unsaturated signals, a detector for determining a TDOA for saturated signals, a detector for determining a TDOA based on light sensor temperature and/or transmitter, and/or a combination thereof. In some examples, the distances 130(1)-(N) determined by the different detector(s) 128(1)-(N) may vary based on variations in the programming and/or arrangement of circuitry of the detector(s). For example, an unsaturated signal detector may determine a TDOA based on a programming/circuitry that correlates the received signal 126 with a reference signal whereas the saturated signal detect may determine the TDOA based on programming/circuitry that detect a rising edge of the received signal 126. The detector(s) 128(1)-(N) may determine a distance 130(1)-(N) based, at least in part, on the TDOA and the speed of light. In some examples, these distances (or TDOAs) may be modified by a calibration technique discussed further in more detail regarding FIG. 4B.

Figure 4A:
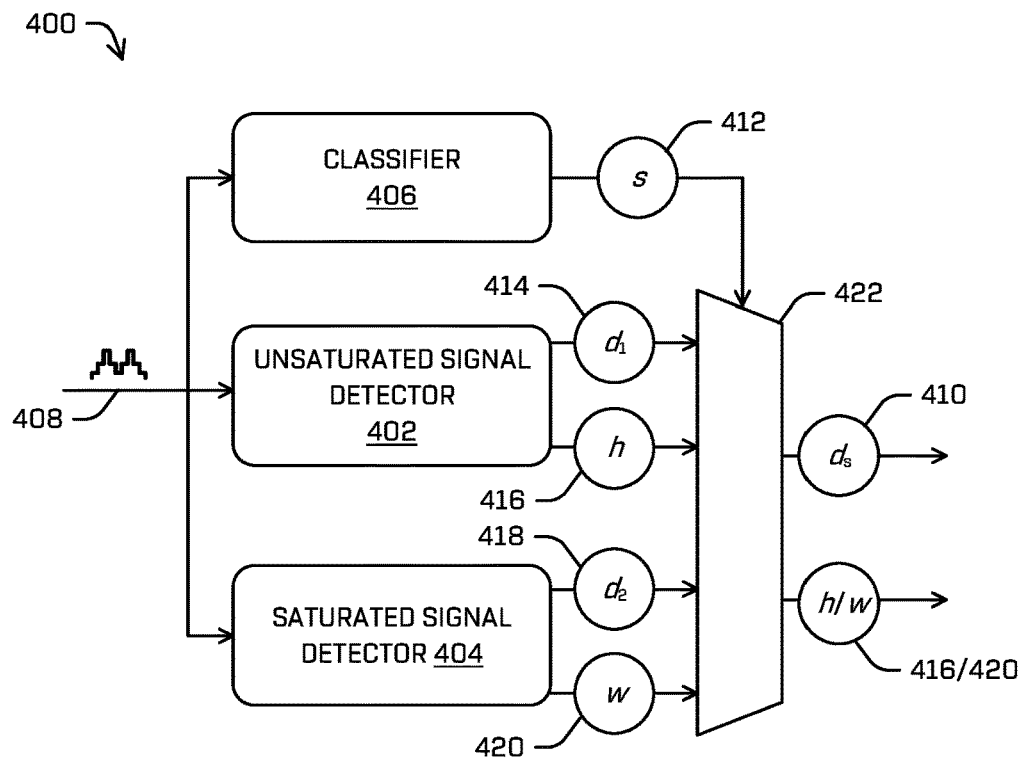
FIG. 4A illustrates a block diagram of an additional or alternate example architecture of a classifier and detector(s) where the classifier selects an output of one of multiple detector(s) for output as the distance measurement.

FIG. 1 illustrates one potential example of the configuration of the example system 100 and FIG. 4A an additional or alternate configuration of the example system 100. For example, in FIG. 1 a classifier 132 may receive the distance(s) 130(1)-(N) and/or other determinations (e.g., indications of a width and/or height of the received signal 126) from the detector(s) 128(1)-(N) and may select one of the distance(s) 130(1)-N as selected distance 134 for output based, at least in part, on the distance(s) 130(1)-(N), other data determined by the detector(s) 128(1)-(N) (e.g., width, height), signal(s) received from the controller 116, and/or the received signal 126 itself. In other examples, such as in FIG. 4A, the detectors 128(1)-(N) and the classifier 132 may contemporaneously receive the received signal 126, the classifier 132 may determine a type of the received signal 126, and, based, at least in part, on the type, the classifier 132 may select one of the distances determined by one of the detector(s) 128(1)-(N) for output. In some examples, the classifier 132 may receive the received signal 126, classify the received signal 126 as a type, and select, based, at least in part, on the type, one of the detector(s) 128(1)-(N) to which to transmit the received signal 204.

In some examples, the detector(s) 128(1)-(N) and/or the classifier 132 may be implemented, at least in part, by a FPGA, a microprocessor, a DSP board, etc. In some examples, the selected distance 134 may be output to a perception engine to be included in a point cloud or for rendering of a representation of the environment surrounding the example LIDAR system 100. In some examples, the point cloud and/or other representation of the environment may be used to determine control signals for operating an autonomous vehicle, a robotic appendage, a video game system output, etc.

Note that FIG. 1 shows logical components and signals in a simplified manner for purposes of describing general characteristics. In actual implementation, various types of signals may be generated and used in order to fire the laser emitter 102, and to measure the TDOA between the output of the laser emitter 102 and the reflected light that is sensed by the light sensor 104.

Example Received Signals

Figure 2A:
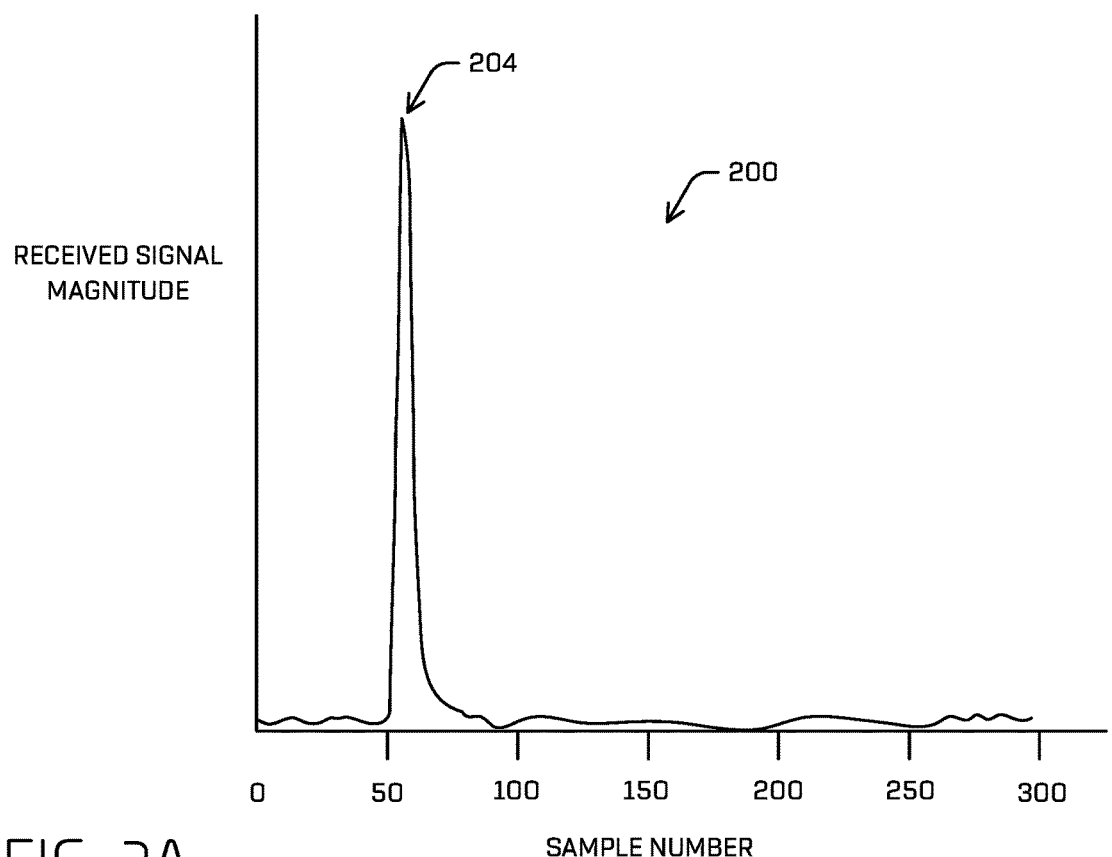
FIG. 2A illustrates an example signal diagram of an unsaturated return signal.
Figure 2B:
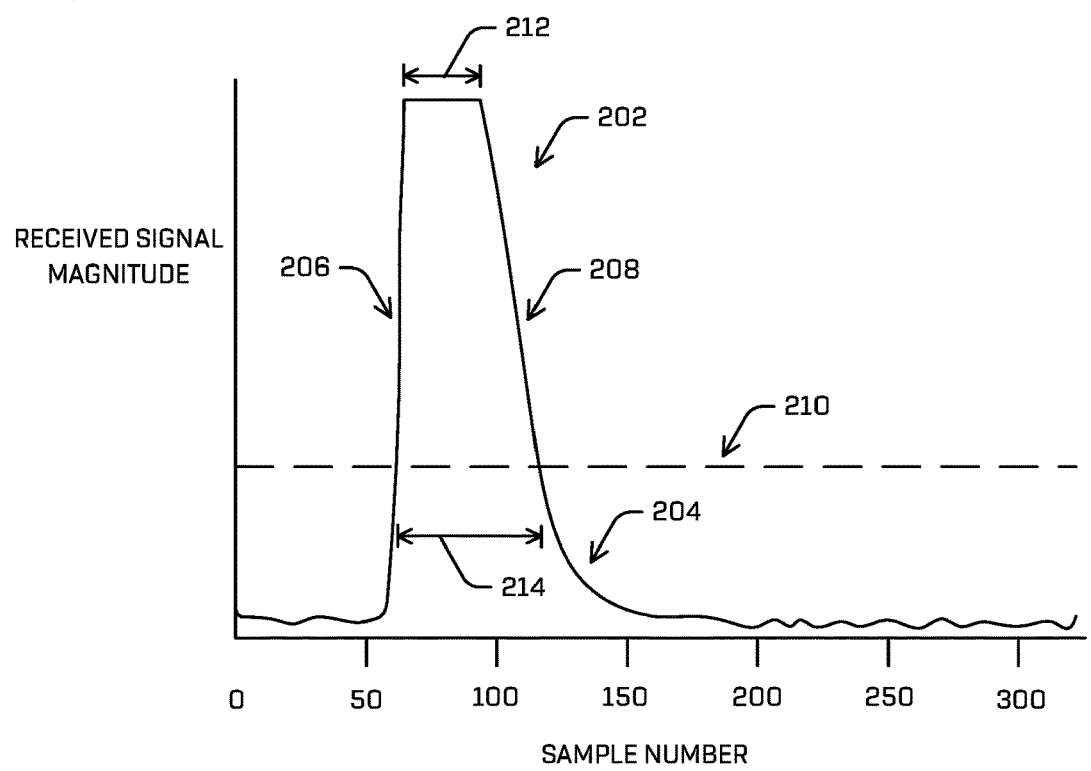
FIG. 2B illustrates an example signal diagram of a saturated return signal.

FIG. 2A illustrates an example signal diagram of an unsaturated return signal 200 and FIG. 2B illustrates an example signal diagram of a saturated return signal 202. Note that, the unsaturated return signal 200 has an identifiable maximum magnitude 204 (or, equivalently, height) that may be used for cross-correlation (or otherwise) with a reference signal to identify a sample number that corresponds with a TDOA, whereas the saturated return signal 202 is notable for its "flat top" that has no discernable maximum value. This "flat top" is caused by the saturation of a capability of the ADC and/or light sensor to produce an output that continues to increase in magnitude as light incident at the light sensor continues to increase in intensity. As discussed in part above, the intensity of the light incident at the light sensor is a function of the transmit power (i.e., the power of the pulse emitted from the light emitter), the proximity to the light sensor of the surface that reflects the emitted pulse, the reflectivity of the surface, etc. Merely estimating that the maximum magnitude of the saturated return signal 202 is half-way between the rising edge 206 and the falling edge 208 is insufficient because the sample number corresponding with the half-way point does not always correspond with the actual maximum value. As can be observed in FIG. 2B, sometimes the falling edge 208 of saturated signals may include a longer tail than a rising tail of the rising edge 206, which indicates non-Gaussian characteristics that may be introduced by highly reflective or very close objects.

FIG. 2B also illustrates a threshold magnitude 210, a first width 212, and a second width 214. The first width 212 is a width (e.g., a number of samples, a time) associated with samples associated within a variance of a maximum magnitude of the received signal 208. For example, although the signal diagrams in FIGS. 2A and 2B depict "smooth" signals, in reality, the signals are more likely to be "jagged" because of noise and may include outliers. For that reason, the first width 212 may be calculated for samples associated with magnitudes that lie within a deviation of an average maximum height and/or a maximum height of the left-most sample associated with the "flat top." The second width 214 is a width calculated between the point where the rising edge 206 meets the threshold magnitude 210 and the point where the falling edge 208 meets the threshold magnitude 210. These widths are discussed in more detail below. In some examples, the height of an unsaturated signal may be used to calibrate an unsaturated signal detector output and the width of a saturated signal may be used to calibrate a saturated signal detector and/or to classify a saturated signal as being saturated.

Example Process

Figure 3:
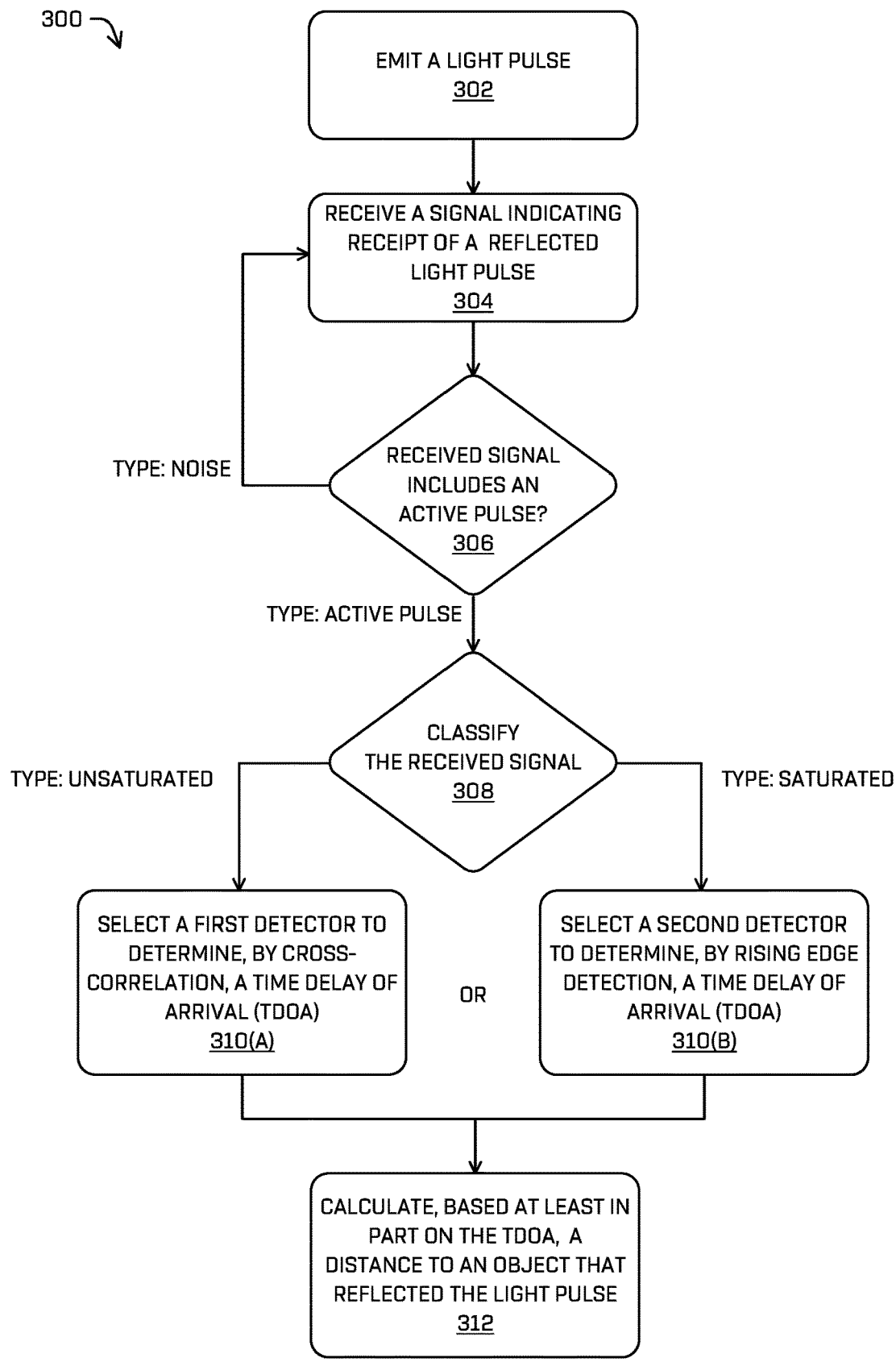
FIG. 3 illustrates a flow diagram of an example process for selecting a light detector, from multiple light detectors, for determining a distance to an object.

FIG. 3 illustrates a flow diagram of an example process for selecting a detector for determining a distance to an object using a LIDAR system that includes multiple light detectors. At operation 302, the example process 300 may include emitting a light pulse, according to any of the techniques discussed herein. In some examples, this may include firing a laser emitter that emits one or more laser pulses into an environment in which the laser emitter is situated.

At operation 304, the example process 300 may include receiving a signal indicating receipt of a reflected light pulse, according to any of the techniques discussed herein. In some examples, this may include receiving light from an object in the environment that reflects at least part of the light pulse to a light sensor. As discussed above, the light sensor may include an avalanche photodiode that converts an intensity of the light incident to the light sensor to a current. In some examples, this current may be amplified, converted, and/or sampled, as described above, and ultimately received by a classifier and/or detector(s) as a received signal. In some examples, the received signal includes a digital signal that includes, at each discrete sample, indications of a magnitude of the current generated by the light sensor. As used herein, the relative magnitude of this indication is referred to as a "height" or "magnitude" of the received signal, even though it would be understood by one skilled in the art, that the value of the received signal is a representation of the magnitude instead of being a true value of the intensity of the light at the sensor.

At operation 306, the example process 300 may include detecting that the received signal includes an active pulse, according to any of the techniques discussed herein. In some examples, this may include the classifier classifying the received as an active pulse based, at least in part, on a dynamic noise floor, as discussed in more detail below. For example, the classifier may continuously determine a dynamic noise floor and classify samples associated with magnitudes that do not meet the dynamic noise floor as noise, returning to operation 304, and classifying samples associated with magnitudes that exceed the noise floor as an active pulse, continuing to operation 308. In some examples, to be classified as an active pulse, the classifier may further require that a threshold number of samples exceed the dynamic noise floor before classifying those samples, and subsequent samples that exceed the dynamic noise floor, as an active pulse.

At operation 308, the example process 300 may include classifying the received signal as a type, according to any of the techniques discussed herein. For example, the classifier may classify the signal as being a type that includes unsaturated, saturated, noisy (e.g., being associated with an SNR value over a SNR threshold), an active signal (i.e., a return pulse corresponding to the emitted light pulse), noise (e.g., not an active signal), a combination thereof, etc. For example, the example process 300 may include determining a noise floor and classifying the received signal as an active signal based, at least in part, on a height of the active signal exceeding the noise floor for those samples that exceed the noise floor and/or for a threshold number of sequential samples that exceed the noise floor. In an additional or alternate example, the example process 300 may include determining that the received signal is a saturated signal based, at least in part, on a width of the signal, a maximum dynamic range of the ADC, and/or determining that a threshold number of samples are associated with a height that exceeds a threshold magnitude.

In some examples, at operation 308, if the classifier determines that the received signal is associated with noise, rather than a return pulse, example process 300 may return to operation 304. For example, the classifier may determine that the received signal does not exceed a dynamic noise floor, as discussed in more detail below.

At operation 310(A)/310(B), the example process 300 may include selecting a detector from among multiple detectors based, at least in part on, the type, according to any of the techniques discussed herein. For example, the classifier may select a detector to transmit the received signal to or, in some arrangements, allow the received signal to pass to the selected detector (e.g., via controlling a switch to the detector) for the selected detector to process the received signal. In an additional or alternate example, the multiple detectors may concurrently receive the received signal as the classifier receives the received signal and the classifier may, at operation 310, select an output of one of the multiple detectors (e.g., via controlling a multiplexer or switch that receives as input outputs of the multiple detectors).

For example, at operation 310(A), the example process 300 may include selecting a first detector to determine, by cross-correlation, for example, a TDOA from the received signal based, at least in part, on classifying the received signal as a type that includes an indication that the received signal is unsaturated. In an additional or alternate example, any method may be used to determine the TDOA. For example, a direct delay calculation may used to determine a delay between a peak in the reference signal and a peak in the received signal. In some examples, the type may additionally include an indication that the received signal is an "active pulse" in determining to select the first detector. At operation 310(B), the example process 300 may include selecting a second detector to determine, by a rising edge detection, a TDOA from the received signal based, at least in part, on classifying the received signal as a type that includes an indication that the received signal is saturated. In some examples, the type may additionally include an indication that the received signal is an "active pulse" in determining to select the second detector.

At operation 312, the example process 300 may include calculating, based, at least in part, on the TDOA, a distance to the object that reflected the light pulse, according to any of the techniques discussed herein. In some examples, this may include calculating the distance based, at least in part, on the speed of light and the TDOA. In some examples, the selected detector may conduct this calculation or a downstream component may conduct this calculation.

Example Detector/Classifier Architecture

FIG. 4A depicts a block diagram of an example architecture 400 for classifying a received signal and selecting a detector output, from among multiple detector outputs, to output as the estimated distance. For simplicity, the example architecture 400 depicted in FIG. 4A includes two detectors, an unsaturated signal detector 402 and a saturated signal detector 404. It is contemplated that more than two detectors may be employed in the example architecture 400, but for simplicity this discussion is limited to these two detectors. Other detectors may include detectors for noisy signal detectors, temperature range-specific detectors, (e.g., a detector that determines a distance and/or TDOA based, at least in part, on non-linearities of the light sensor when the light sensor and/or the LIDAR system is within a range of specified temperatures), power range-specific detectors (e.g., a detector that determines a distance and/or TDOA based, at least in part, on non-linearities in the light sensor and/or the light emitter when the emission power is within a range of specified powers), etc. Detectors 402 and 404 may represent two of detectors 128(1)-(N).

The example architecture 400 may further include a classifier 406, which may represent the classifier 132 and which may receive a received signal 408, which may represent received signal 126. In some examples, the classifier 406 may be programmed to and/or include an arrangement of circuitry to discriminate an active pulse from noise, classify the received signal 408 as a type, and/or select a detector and/or a detector output based, at least in part, on the type. FIG. 4A depicts an example where the classifier 406 generates a selection 412 to select an output of one of the detectors 402 or 404 for output as the selected distance 410.

Figure 5:
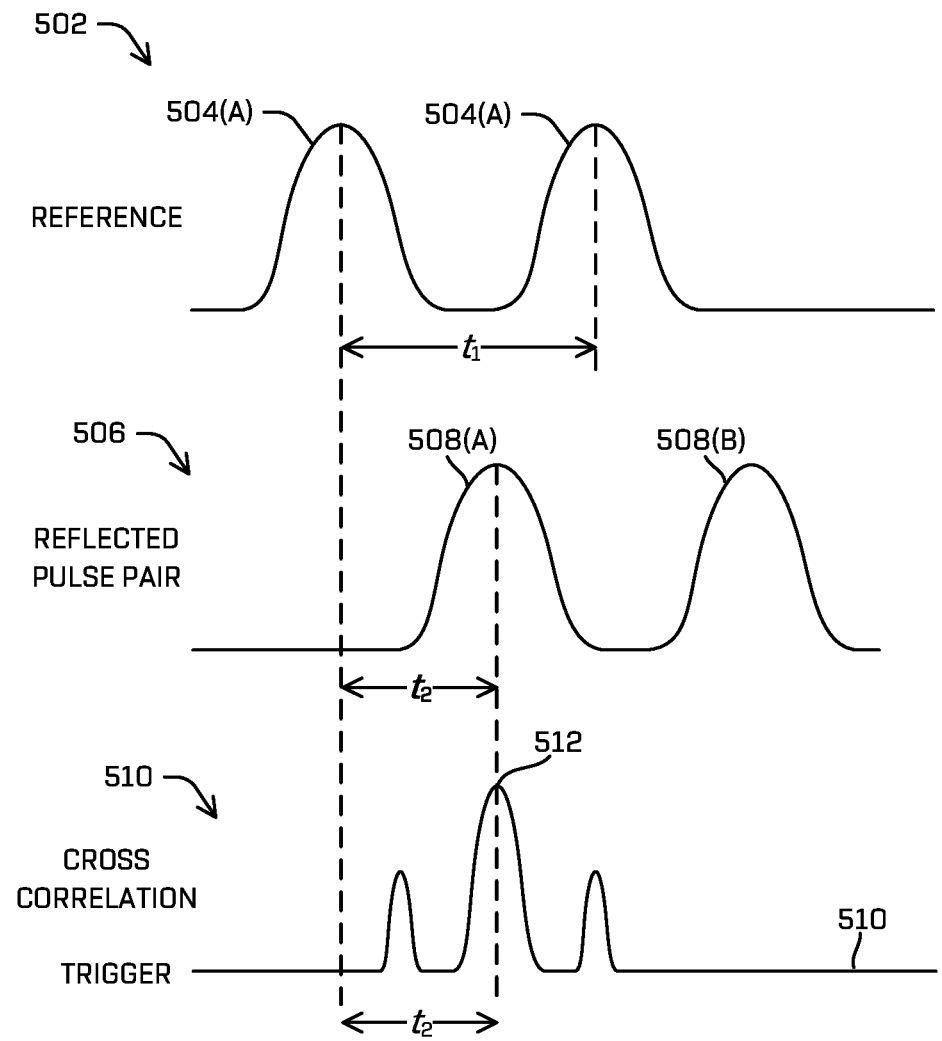
FIG. 5 illustrates example waveforms received and generated according to an example process for correlating a return signal with a reference signal.

For example, unsaturated signal detector 402 may conduct a cross-correlation of the received signal 408 with a reference signal, as discussed in further detail in regard to FIG. 5, to determine a TDOA, from which the unsaturated signal detector 402 may determine a first distance 414. In some examples, an unsaturated signal detector 402 may additionally or alternatively determine a height 416 (e.g., a maximum value) of the received signal 408. The saturated signal detector 404 may be programmed to and/or include an arrangement of circuitry to detect a rising edge of the received signal 408, correlate the rising edge with a time from which the saturated signal detector 404 determines a TDOA, and calculate a second distance 418 from the TDOA. In some examples, the saturated signal detector 404 may also determine a width 420 of the received signal 408 (e.g., a number of samples that are associated with a same average maximum value of the received signal 408, a number of samples from a rising edge to a falling edge of the received signal 408).

In some examples, the unsaturated signal detector 402, the saturated signal detector 404, and the classifier 406 may receive the received signal 408 and the classifier 406 may classify the received signal 408 as a type and, based, at least in part, on the type, may select one of the outputs of the detectors 402 or 404 to be passed as the selected distance 410. In some examples, based on the detector selected, the height 416 may also be passed if the unsaturated signal detector 402 is selected or the width 418 may be passed if the saturated signal detector 404 is selected. In some examples, the outputs of the detectors may be inputs to a multiplexer 422 and the classifier 406 may generate a selection 412 that controls the multiplexer to output signal(s) corresponding to the selection 412. Regardless of the actual implementation employed, the selection 412 may include a control signal generated by the classifier 406 to select at least one detector's output to be output to downstream components as the final estimated distance and/or for modification by the calibrator 428.

For example, where the received signal is a saturated signal, the unsaturated signal detector 402, the saturated signal detector 404, and the classifier 406 may receive the received signal 408 and the classifier 406 may generate a selection 412 identifying the outputs of the saturated signal detector (i.e., second distance 418 and, in some examples, also width 420). The multiplexer 422 may receive the selection 412 and cause the output of the unsaturated signal detector 402 to be blocked but for the second distance 418 to be passed as the selected distance 410 and the width 420 to be passed, in examples where the saturated signal detector 404 also determined the width 420.

In some examples, the detectors 402 and 404 may additionally or alternatively include other detectors such as, for example, a cross-correlation detector, a front edge detector, a deconvolution detector, a frequency domain analysis detector, etc. For example, these other detectors may be used as part of detectors 402 and/or 404 and/or may be completely separate detectors to which the received signal is passed and that separately determine a TDOA. In some examples, the received signal 408 may be filtered before it is received by any of the detectors and/or the classifier 406 and/or the received signal 408 may be filtered at any point in the operations of the detectors and/or the classifier 406. For example, the received signal 408 may be passed through a low-pass filter to smooth the signal.

In some examples, the additional and/or alternate detectors may include detector(s) to handle a split beam, which may occur when a transmit pulse hits an object (e.g., staircase, first reflection from a window and later reflection from an object behind the window) that splits the reflected light pulse into two pulses (in time). For example, a deconvolution detector may determine a Weiner deconvolution to recover the pulse delay from the light transmitter to the light sensor when the beam is split and/or a frequency domain detector may conduct optimal filtering and/or frequency domain analysis to recover the split beam reflections. The deconvolution detector may, in some examples, deconvolve the received signal based, at least in part, on the transmitted pulse and the received signal. In this example, the deconvolution detector may select two peaks that are next to each other and/or closest to each other to conduct the TDOA determination. In some examples, a distance from each peak of the one or more peaks may be recovered. In additional, or alternative, examples, distances associated with some of the multiple peaks which are less than a threshold distance (e.g. which may result from reflections of the LIDAR sensor itself) may be detected and discarded.

In some examples, the classifier 406 may classify the received signal 408 as an active pulse based, at least in part, on determining that the received signal 408 includes a threshold number (e.g., one or more, three or more, higher as the sample rate is higher) of samples that exceed a dynamic noise floor determined by the classifier 406, discussed in more detail below. In some examples, the classifier 406 may control the multiplexer 422 to remain closed (i.e., passing no outputs) until the classifier 406 classifies the received signal 408 as an active pulse. For example, the classifier 406 may continuously determine a dynamic noise floor and compare magnitudes of the received signal 408 to the dynamic noise floor and may output a selection 412 that does not allow any of the detector outputs to pass until the classifier 406 determines that three or more samples of the received signal 408 are associated with magnitudes that exceed the noise floor. At that point, the classifier 406 may also classify the received signal as a type and change the selection 412 to indicate which detector output to pass. Further, though described as a dynamic noise floor, any other discrimination of an active pulse is contemplated, for example, a fixed threshold, a number of received points, and the like.

In some examples, the classifier 406 may classify the received signal 408 as a saturated signal based, at least in part, on a threshold number of samples exceeding the dynamic noise floor (e.g., three or more, ten or more), a threshold number of samples that are associated with magnitudes that are within a deviation of each other (e.g., ±5 units, depending on the scale of the ADC), a threshold number of samples exceeding a threshold magnitude, a width of the received signal 408, and/or a combination thereof (collectively referred to herein as a threshold magnitude). In some examples, the classifier 406 may classify the received signal 408 as an active pulse based, at least in part, on three or more samples exceeding the threshold magnitude and as a saturated pulse based, at least in part, on 126 or more samples exceeding the threshold magnitude. In some examples, if the number of samples of the received signal 408 that exceeds the threshold magnitude is greater than three but less than 126, the classifier 406 may classify the received signal 408 as an unsaturated signal. Although this example uses the number 126, the number of samples used to discriminate between an active unsaturated pulse and an active saturated pulse may vary based, at least in part, on the sampling frequency of the ADC.

In some examples, the classifier 406 may include a decision tree or any arrangement thereof, such as a random forest and/or boosted ensemble of decision trees; a directed acyclic graph (DAG) (e.g., where the nodes are organized as a Bayesian network); deep learning algorithm(s), etc. In some examples, the classifier 406 may include programming and/or circuitry for determining the dynamic noise floor, a comparator for comparing magnitudes of the received signal 408 to the dynamic noise floor, and logic for driving a pin state to indicate the selection 412.

Figure 4B:
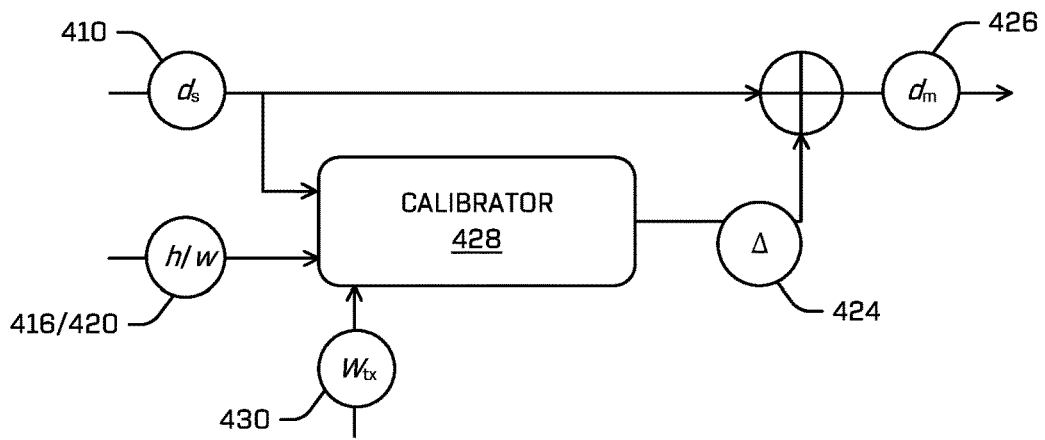
FIG. 4B illustrates an example architecture for calibrating the light detector output based on non-linearities of components of the LIDAR system.

In some examples, the selected distance 410 may be used by downstream components as the final estimated distance—for example, for use in constructing a point cloud representation of the environment. In some examples, the selected distance 410 may be modified by an offset distance 424 to determine a modified distance 426 before being used by downstream components as the final estimated distances, as depicted in FIG. 4B. In some examples, a calibrator 428 may receive the selected distance 410, the height 416 and/or width 420, and/or the power of the light that was emitted by the light emitted (transmit power 430). In some examples, the calibrator 428 may be include a lookup table of experimental values that includes an offset distance 424 that is associated with at least a height 416 and a transmit power 430, for unsaturated signals, or a width 420 and transmit power 430, for saturated signals. In some examples, the offset distance may additionally be a function of the selected distance 410, temperature of the light sensor and/or LIDAR system, etc. In some examples, the table may be populated by recording the variation between an actual distance to an object and the distance estimated by the detector and varying the transmit power of the power transmitter and varying the reflectivity of the surface (e.g., using a neutral density filter) to generate received signals of varying heights and widths. For example, the calibrator 428 may determine that, for an unsaturated signal where the light sensor is 75 degrees Fahrenheit, the transmit power 430 is 35 milliwatts, and the received signal power (i.e., height) is 32 milliwatts, the selected distance 410 should be adjusted by −5 millimeters. The calibrator 428 may subtract this from the selected distance 418 and provide the modified distance 426 to downstream components as the final estimated distance. The calibrator 428 may thereby account for non-linearities in the light emitter and/or the light sensor, further increasing the accuracy of the estimated distance.

In some examples, the calibrator 428 may include a lookup table that maps experimental transmit power and experimental received height and/or width of the received signal to a distance offset determined by taking the difference of the measured distance to a test object and the estimated distance based on the received signal. In some examples, to determine the offset distance online, the calibrator 428 may conduct a bilinear and/or bicubic interpolation of the actual transmit power and the received signal height and/or width to determine the distance offset. In some examples, to account for time-varying temperature fluctuations during population of the lookup table, the distance to the object may be held constant and estimated by the system at different operating temperatures. A curve may be fit to the temperatures and estimated distances (and/or to the variations of the estimated distances form the measure distances). In some examples, the curve may include a line. In this way, the calibrator 428 may adjust the distance offset by the distance variation specified by the curve. In so doing, this eliminates the need for the lookup table to include a temperature dimension, since the distance offset may be adjusted for temperature based on the curve or line.

Example Unsaturated Signal Detector

FIG. 5 depicts general characteristics of the emitted light pulses, unsaturated received signal indicating the reflected light pulses, and the cross-correlation between the emitted light pulses and the received signal. In some examples, unsaturated signal detector may determine a TDOA according to the following discussion.

FIG. 5 shows a first waveform 502 representing the timing and intensity of light emitted by a laser emitter. The light for a single distance measurement is emitted as a sequence or burst of multiple pulses, in this example comprising a pair of pulses 504(A) and 504(B), each having a width of approximately 5 to 50 nanoseconds. However, in other examples, sequences or bursts of pulses having more than two pulses of longer or shorter duration can be used. In the illustrated example, the pulses of the pair are spaced from each other by a time interval having a duration $t_1$. In one embodiment, each pulse has a time interval duration that varies between 20 and 50 nanoseconds. The pulses are generated by the discharge of capacitors through the laser emitter, and therefore have Gaussian shapes.

FIG. 5 shows a second waveform 506 representing the magnitude of the reflected light received and detected by the light sensor, such as may be indicated by the received signal 126 and/or 408. The second waveform 506 includes a pair of pulses 508(A) and 508(B) corresponding respectively to the pulses 504(A) and 504(B). The pulses of the second waveform 506, however, are delayed by a time $t_2$ relative to the first waveform 502. The timing relationship between the pulses of the second waveform 506 should be the same as that of the emitted pulses 504.

FIG. 5 shows a third waveform 510 representing the cross correlation between the first waveform 502 and the second waveform 506. The highest peak 512 of the third waveform 510 corresponds in time to $t_2$, which is the difference in time between the first waveform 502 being emitted and the second waveform 506 being detected. It is this time, $t_2$, that is unidentifiable for saturated pulses since the flat top of saturated signals does not produce a peak that accurately correlates with the time $t_2$. Therefore, according to the configuration of FIG. 4A, the first distance 414 determined by an unsaturated signal detector may be inaccurate if the received signal 408 is a saturated signal.

Example Saturated Signal Edge Detection

FIGS. 6A-6F depict a technique for determining an arrival time of a reflected pulse at a light sensor for received signals that are saturated. This arrival time may be used to determine a TDOA for determining the second distance 418, in some examples. For example, the saturated signal detector 404 may include programming and/or circuitry to conduct the techniques described in FIGS. 6A-6F. In some examples, the technique includes detecting an edge of the received signal, which may be represent the received signal 126 and/or 408. This may include determining a particular location on the rising edge (referred to herein as the "intermediate location"), as described below, and identifying a sample number (e.g., potentially a fractional sample since a whole sample number may not correspond exactly to the location) that corresponds with the intermediate location.

Figure 6A:
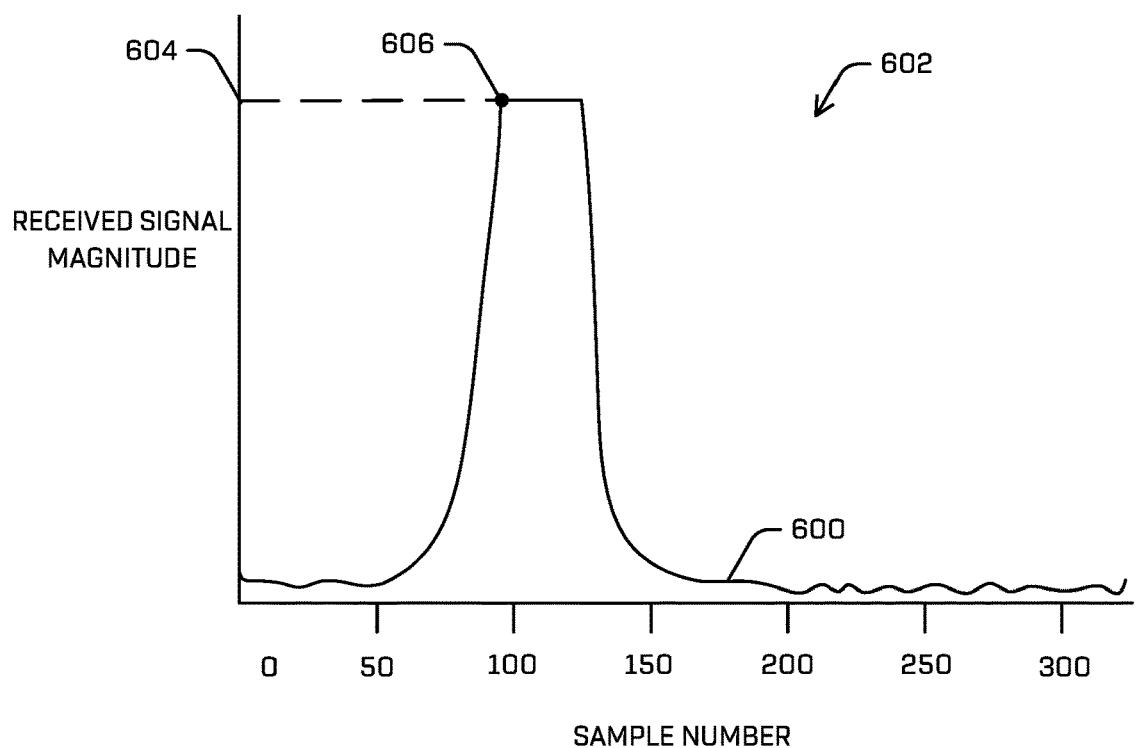
FIGS. 6A-6F illustrate example signal diagrams of an example process for detecting a rising edge of a saturated return signal.

FIG. 6A depicts a received signal 600 that may represent the received signal 126 and/or 408. In some examples, a classifier may have already classified the received signal 126 as being a "saturated signal" type and passed the received signal 600 to the saturated signal detector or, in another example, the saturated signal detector may continuously receive the received signal 126 and determine an output, allowing the classifier to determine when to pass the output of the saturated signal detector (e.g., when the classifier has classified the received signal 126 as indicating an active pulse and as being saturated).

At operation 602, the saturated signal detector may determine a first maximum value 604 of the received signal 600 in time/associated with a lowest sample number (e.g., the first sample associated with a saturation value, e.g. from the ADC). The sample associated with this value may be referred to as a left-most sample 606 (i.e., earliest in time/sample sequence), indicated in FIG. 6A, and also referred to herein as a max sample. In some examples, the first maximum may be detected from an unfiltered version of the received signal and, in some examples, the subsequent operations may be conducted on a filtered version of the received signal. For example, at operation 602, the detector may identify the first maximum from the unfiltered received signal, filter the received signal (e.g., using a low-pass filter, using other filters or operations depending on additional detector functions such as, for example, conducting a Fourier transform of the received signal to identify frequency domain components of the received signal), then proceed to operation 608. In some examples, determining the first maximum may include using a maxima location technique, including techniques that incorporate a variance to account for noise. For example, the variance may be set based, at least in part, on a SNR, noise power, the dynamic noise floor discussed below, or other indices of current noise.

Figure 6B:
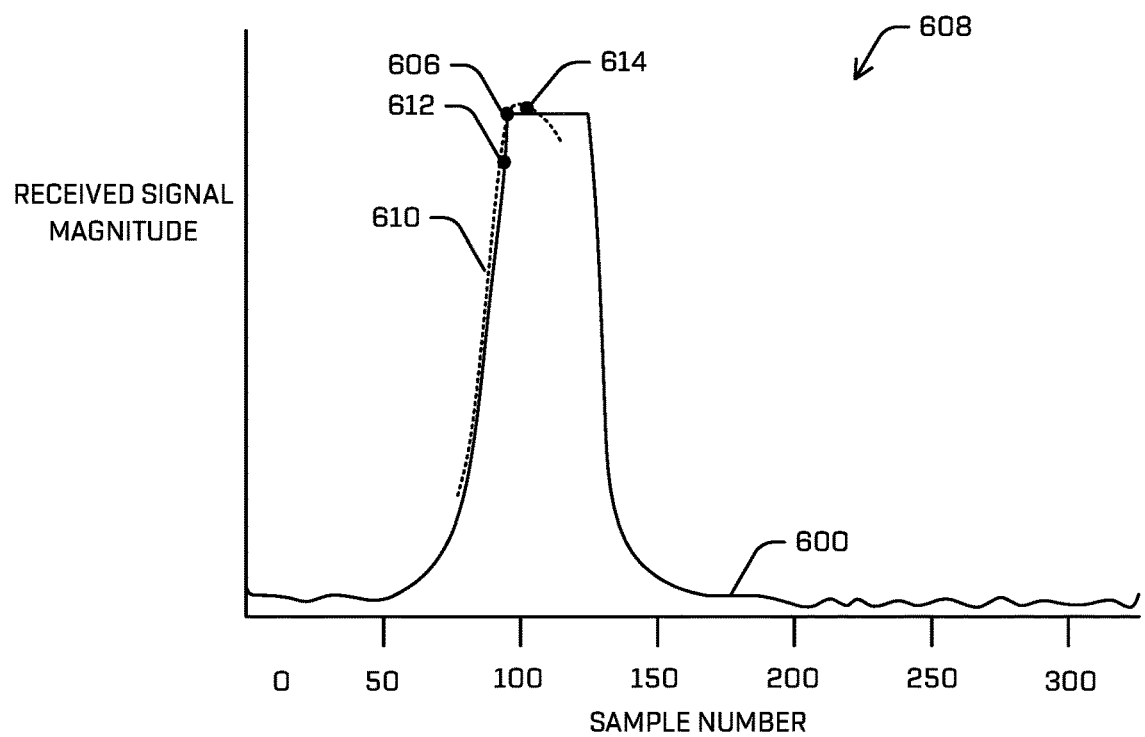

FIG. 6B depicts operation 608. At operation 608, the saturated signal detector may fit a first polynomial curve 610 to the left-most sample 606 and at least two prior samples, 612 and 614. In some examples, the first polynomial curve 610 may include a second-degree or a third-degree polynomial function. Any suitable curve fitting techniques may be employed. For example, the saturated signal detector may determine the first polynomial curve 610 using a least squares regression analysis and/or a non-linear least squares regression analysis such as, for example, a Gauss-Newton algorithm where the damping factor is based, at least in part, on the noise power, dynamic noise floor, and/or SNR.

Figure 6C:
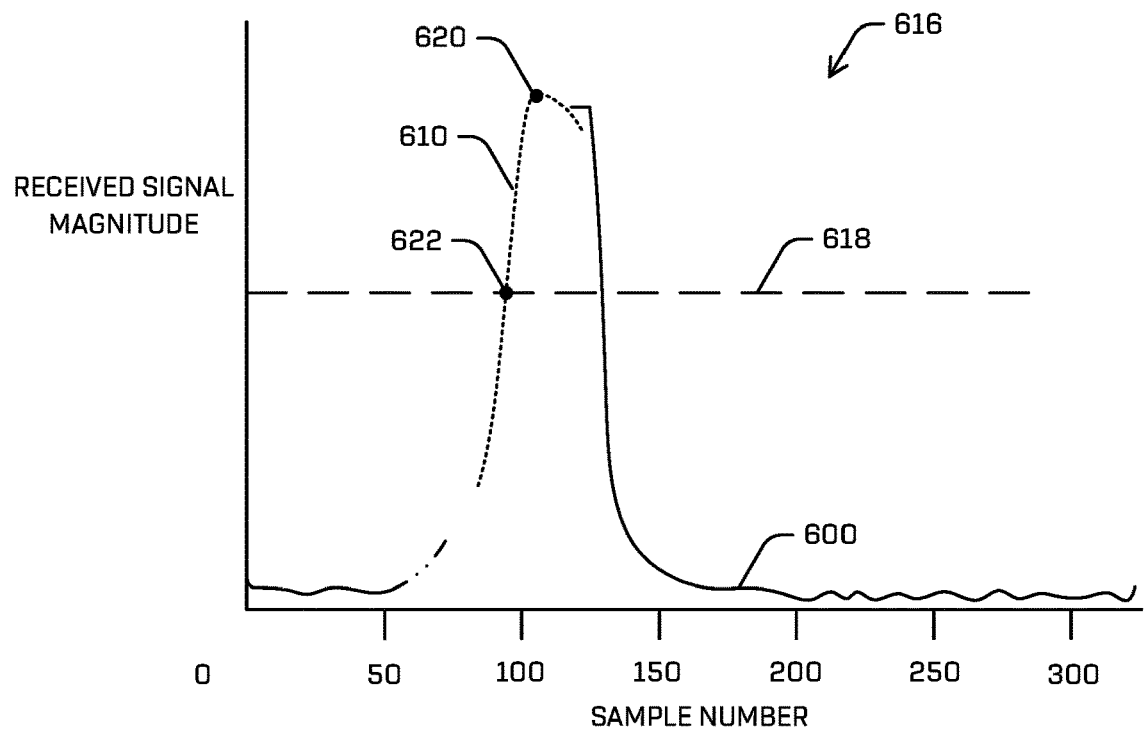

FIG. 6C depicts operation 616 and, for clarity, a portion of the received signal 600 has been removed. At operation 616, the saturated signal detector may define an intermediate threshold magnitude 618 based, at least in part, on the first polynomial curve 610. For example, the saturated signal detector may determine a synthetic maximum 620 from the first polynomial curve 610 and define the intermediate threshold magnitude 618 to be a value that is a predetermined percentage of the synthetic maximum 620 (e.g., 60% of the maximum, any percentage between 50% and 80%, a percentage as low as 40% but with increased inaccuracy of the results). In some examples, the saturated signal detector defines the intermediate threshold magnitude 618 to be 60% of the synthetic maximum 620.

In some examples, the saturated signal detector may determine the synthetic maximum 620 by identifying a maximum value of the first polynomial curve 610 (e.g., a local maximum, a global maximum, depending on the order of the polynomial). Note that, although FIG. 6C depicts the first polynomial curve 610 as a line segment, in an actual implementation, the first polynomial curve 610 may include at least a local maximum that lies near the left-most sample 606. In an additional or alternate example, the saturated signal detector may determine the synthetic maximum 620 by evaluating the polynomial curve at the sample number corresponding to the left-most sample 606 (e.g., "plugging" the sample number into the polynomial). In some examples, operation 616 may further include checking coefficients of the polynomial curve to ensure that the polynomial curve includes a concave-down shape and/or that the coefficients indicate that the polynomial curve is a second, third, or higher order polynomial. This may be done before determining the synthetic maximum 620 to ensure that a maximum can be found and to ensure accuracy of the subsequent operations.

Operation 616 may additionally or alternatively include determining a point 622 of the first polynomial curve 610 that intersects the intermediate threshold magnitude 618.

Figure 6D:
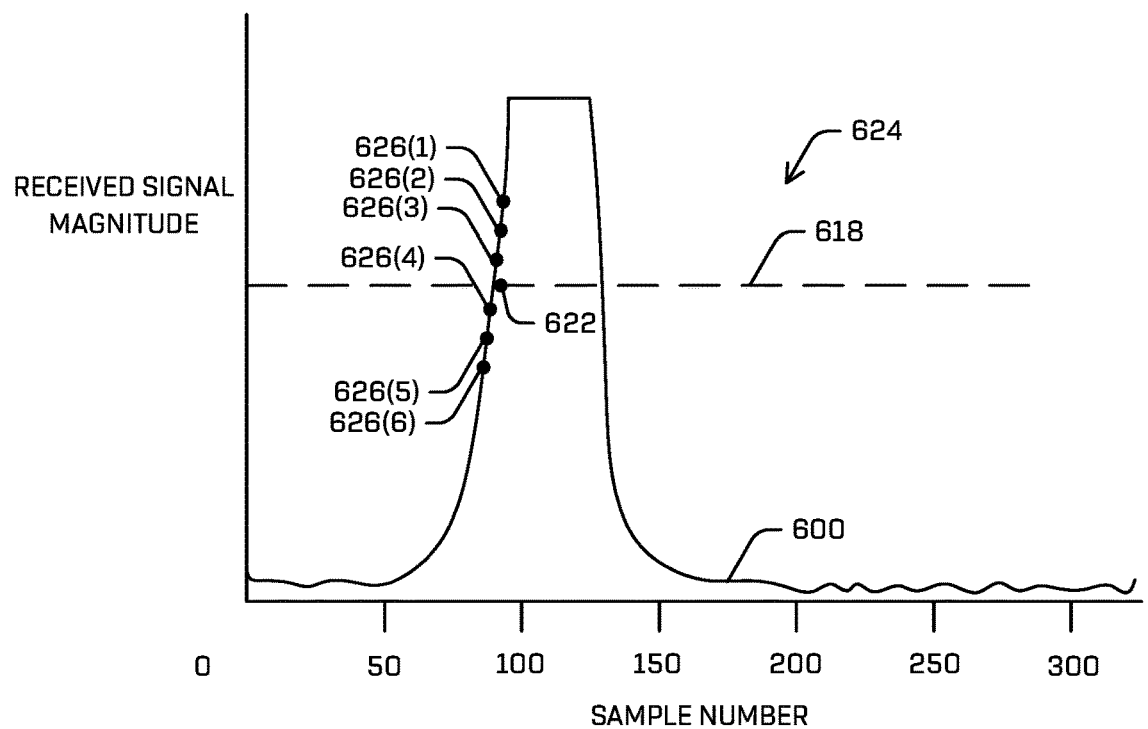

FIG. 6D depicts operation 624. At operation 624, the saturated signal detector may determine at least three samples of the received signal 600 that are nearest to the point 622 (i.e., the intersection of the first polynomial curve with the intermediate threshold magnitude). In some examples, the nearest six samples of the receives signal 600 may be found, illustrated as 626(1)-(6) in FIG. 6D.

Figure 6E:
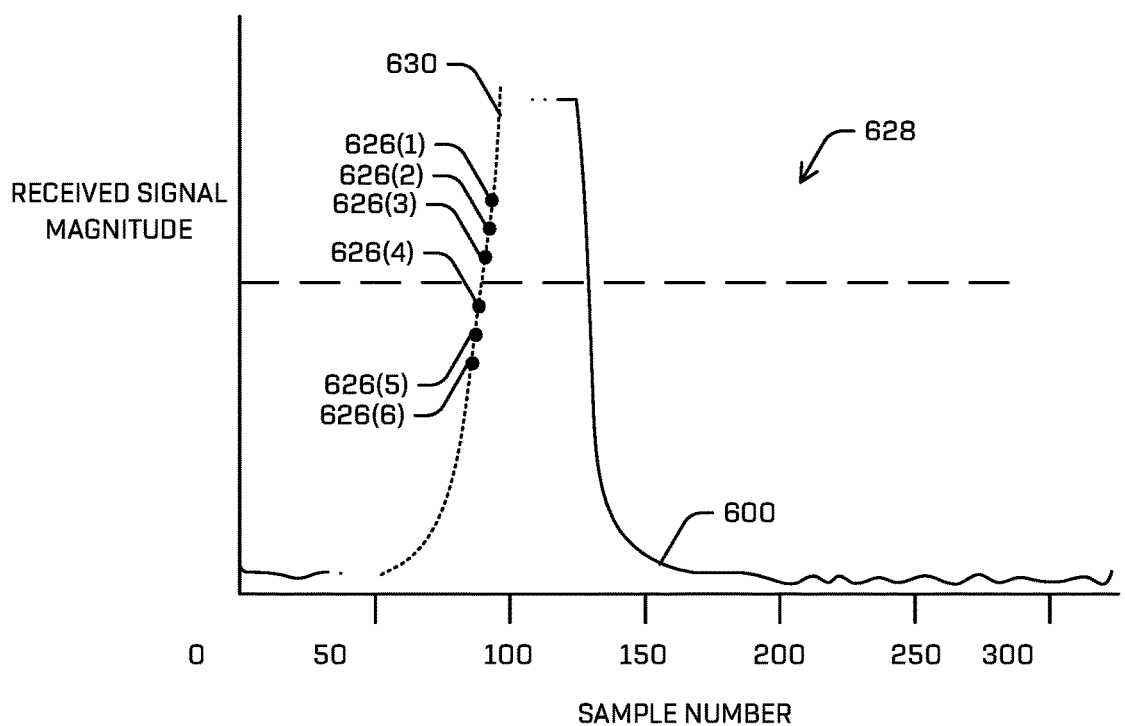

FIG. 6E depicts operation 628 and, for clarity, a portion of the received signal 600 has been removed. At operation 628, the saturated signal detector may fit a second polynomial curve 630 to the three or more samples (the six samples 626(1)-(6) in FIG. 6E), referred to herein as "intermediate samples." Again, any suitable fitting algorithm may be used to fit the second polynomial curve 630 to the intermediate samples and the second polynomial curve 630 may be a second-order or third-order polynomial. In some examples, instead of using a polynomial curve 630, a line may be fit to the intermediate samples nearest the intersection of the first polynomial curve with the intermediate threshold magnitude. In such an example, at operation 628 the saturated signal detector may fit a line to two or more samples.

Figure 6F:
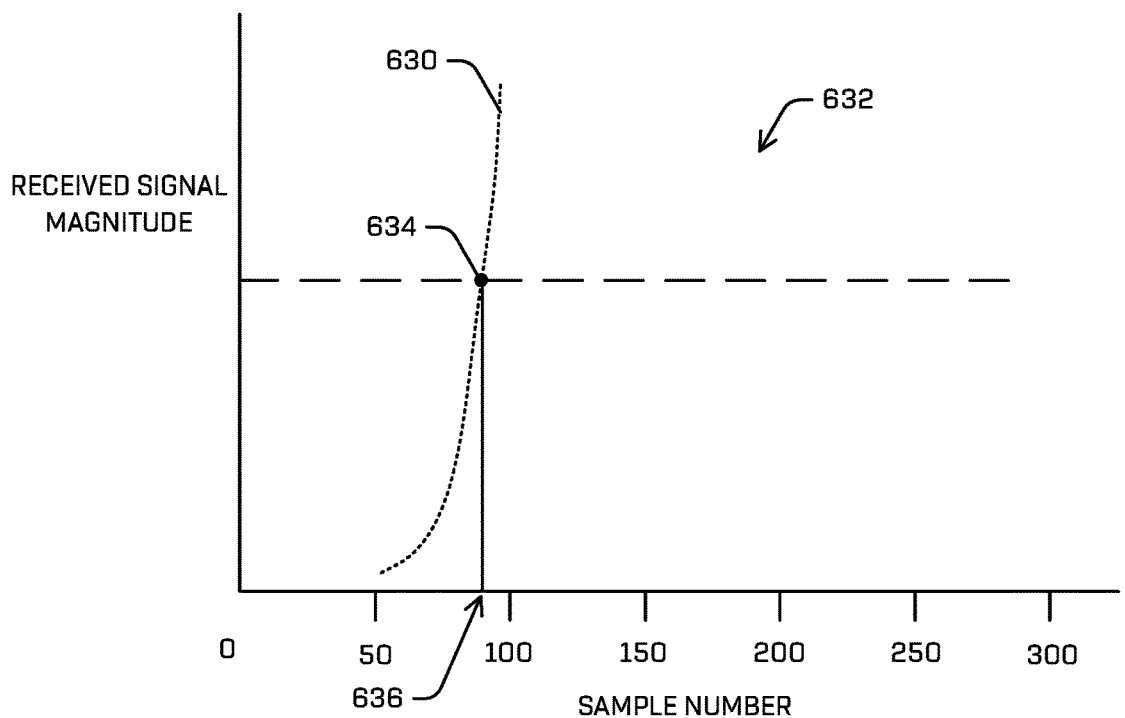

FIG. 6F depicts operation 632. At operation 632, the saturated signal detector may determine a second intersection 634 of the second polynomial curve 630 and the intermediate threshold magnitude 618. This point is referred to herein as the intermediate point 634. In some examples, the intermediate point 634 is an indication of the rising edge of the received signal 600. In some examples, the saturated signal detector may determine a sample number 636, referred to herein as the sample index, that corresponds to the intermediate point 634. This sample number 636 may include a fractional sample number (e.g., as may be interpolated between two samples). In some examples, the saturated signal detector may use the sample number 636 corresponding to the intermediate point 634 to determine a TDOA. For example, the saturated signal detector may receive a reference signal from the controller to toll a time from a sample number corresponding to emission of the light pulse from the light emitter until the sample number 636. Converting this to a TDOA may include determining a fractional number of samples between the sample number at which the light pulse was emitted and the sample number 636 (i.e., the sample number corresponding to the arrival time estimated by the described edge detection technique) and using the fractional number of samples corresponding to the delay and frequency of the reference signal (which may match or be correlated to a sample rate of the ADC) to convert the delay in sample numbers to a time delay. In some examples, the saturated signal detector may use the TDOA to determine a distance (e.g., the second distance 418) based, at least in part, on the speed of light. In some examples, the saturated signal detector may output this distance.

In some examples, the saturated signal detector may discard the intermediate point 634 as corresponding to an invalid edge detection if the sample number 636 is outside a predetermined range (e.g. a range of sample numbers). For example, and depending on the sampling frequency of the ADC, the saturated signal detector may discard the sample number 636 if the sample number is below sample number 2 or above sample number 5. In another example, the saturated signal detector may discard the sample number 636 if the sample number is below sample number 1 or above sample number 6. This is a very generous range to ensure that an edge detection for a true active pulse isn't discarded, although the range of 2 to 5 is generally safe.

In additional or alternate examples, the saturated signal detector may output a width of the received signal 600. For example, the saturated signal detector may reverse the process described to find the intermediate point 634 to find a right-hand intermediate point (e.g., by finding a right-most sample associated with the maximum magnitude and at least two samples that follow the right-most sample, a first polynomial that fits those samples, etc.) and may measure the width (e.g., fractional number of samples between, time between) between the left-hand intermediate point 634 and the right-hand intermediate point. In an additional or alternate example, the width of the "flat top" may be used (e.g., the fractional number of samples that are associated with the maximum magnitude of the received signal 600, within a variance) as the width or any other method may be used.

Example Active Pulse Detection

Figure 7A:
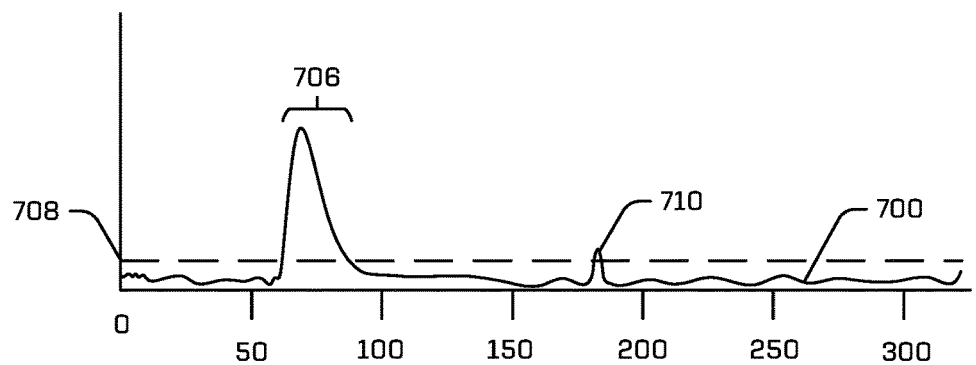
FIGS. 7A-7C illustrate example received signals and static thresholds for determining an active pulse.
Figure 7B:
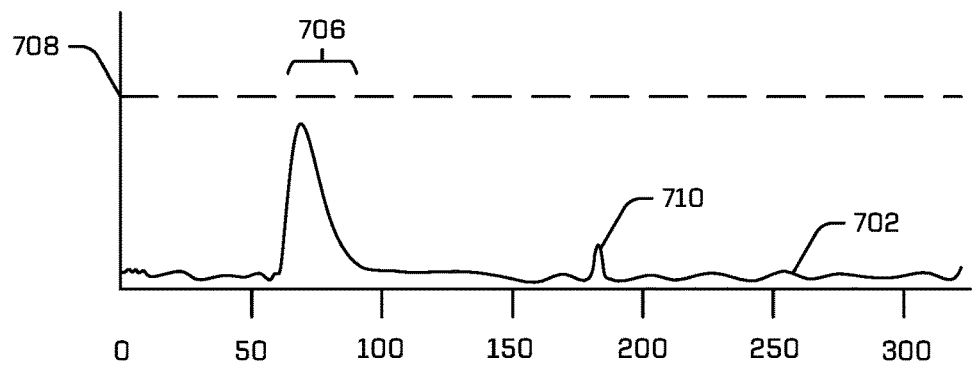
Figure 7C:
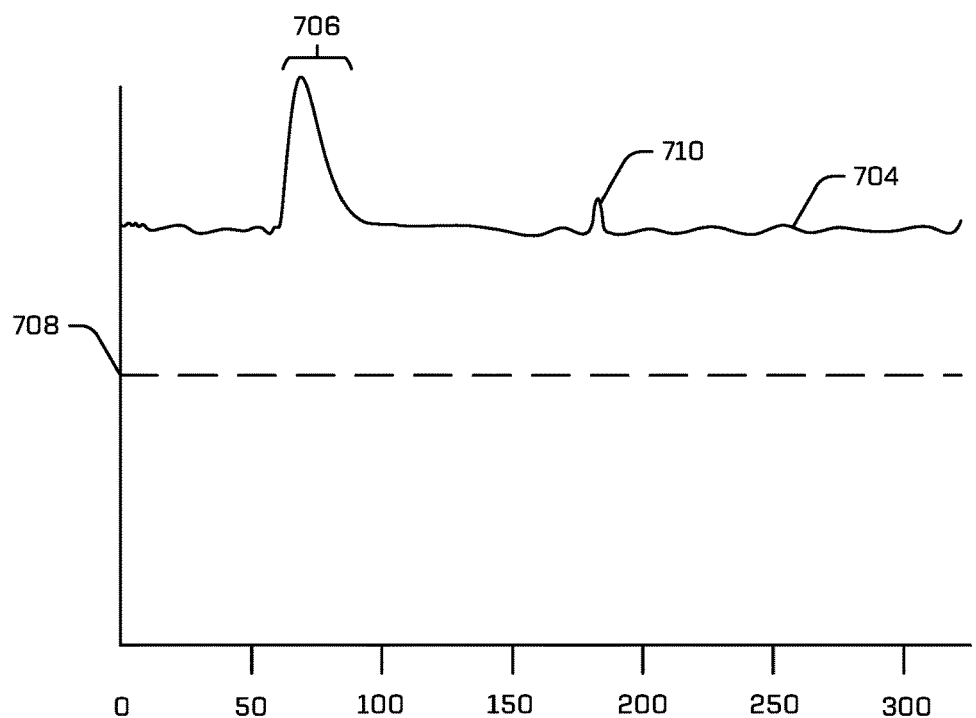

FIGS. 7A-7C illustrates signal diagrams for example received signals 700, 702, and 704 that each include an active pulse 706 (depicted as a saturated signal). The remaining portions of the received signals 700, 702, and 704 are merely noise. The received signals 700, 702, and 704 may represent any of the received signals discussed herein. An "active pulse" is the true positive portion of a signal that corresponds to the reflection of an emitted light pulse. FIGS. 7A-7C all depict a static threshold magnitude 708 and exemplify the potential failings of such as system for accurately identifying the active pulse and/or classifying a signal as a saturated signal.

For example, FIG. 7A may accurately identify the active pulse 706 portion of the received signal 700 by determining that the samples associated with the active pulse region of the received signal 700 exceed the threshold magnitude 708. However, this method may identify a spike 710 in noise as an active signal, which is a false positive. This noise spike 710 may be attributable to glancing sunlight hitting the light sensor (e.g., reflection from a reflective surface), headlights at night, etc. In some examples, this may be prevented by identifying, as an active pulse, samples associated with magnitudes that exceed the threshold magnitude 708 for a sequential number of samples.

However, this is not sufficient to prevent false positives and false negatives, in some scenarios. For example, FIG. 7B may depict a received signal 702 that is received during night conditions where the transmit power of the light emitter may be reduced to conserve energy and/or where a sudden change in noise conditions and/or reflectivity of objects (e.g., dense foliage) decreases the overall power of the received. In this example, since no portion of the received signal 702 exceeds the threshold magnitude 708, the active pulse 706 would not be identified as such. Instead, the active pulse 706 would be identified as noise, which is a false negative.

Moreover, in sunny conditions or otherwise high noise conditions, as depicted in FIG. 7C, the received pulse 704 may entirely exceed the threshold magnitude 708. In this example, the entire received signal 704 might be identified as an active pulse, which is a false negative for the noise portion of the signal even though this is a true positive for the active pulse portion.

Although, in examples that employ an ADC, the ADC may scale its output as a function of total power, thereby normalizing the received signal, this may not be sufficient to avoid the issues discussed above with using a static threshold to identify an active pulse.

Figure 7D:
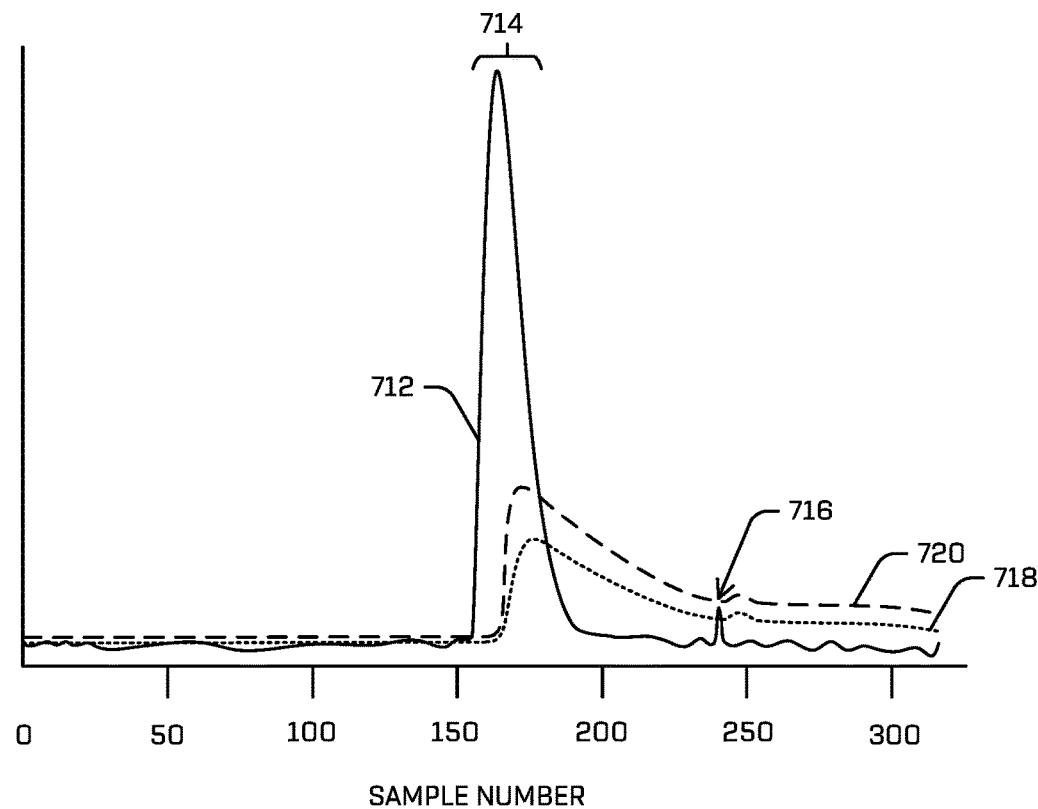
FIG. 7D illustrates an example received signal and a dynamic noise floor for determining an active pulse and/or for classifying a signal as a saturated signal.

FIG. 7D illustrates an example received signal 712 (solid line) that includes an active pulse 714 and a noise spike 716; a dynamic noise floor 718 (micro dashed line); and an adjusted dynamic noise floor 720 (heavy dashed line). The received signal 712 may represent any of the received signals discussed herein. In some examples, the classifier discussed herein may determine a dynamic noise floor and/or an adjusted dynamic noise floor to classify at least a portion of the received signal 712 as an active pulse (i.e., discriminating the active pulse from mere noise) and/or to classify the received signal 712 (e.g., the active pulse portion of the received signal 712) as a type. In some examples, this may be effective to discriminate the active pulse (i.e., the reflection off the object of the light emitted by the light emitter) from mere noise. Noise may be introduced into the received signal 712 by noise in the photodiode, background light in the environment (e.g., light in a field of view of the light sensor, but not attributable to the reflection of the emitted light), infrared radiation, solar noise, electrical and/or thermal noise, etc.

In some examples, the classifier may determine the dynamic noise floor 718 based, at least in part, on calculating a moving average of the received signal 712. In some examples, moving average may be based, at least in part, on a last moving average value and a current value (e.g., magnitude, height) of the received signal 712. In some examples, the moving average may be a simple moving average, a weighted moving average, exponential moving average, etc. In some examples, the last moving average value may be weighted more heavily than the current value of the received signal 712. For example, the moving average for a current, n-th, sample may be calculated as follows: $mavg_n = 0.99 \cdot mavg_{n-1} + 0.01 \cdot M_n$, where M is the magnitude of the received signal 712. This is the equation used to generate the dynamic noise floor 718 in FIG. 7D.

In some examples, the classifier may modify the dynamic noise floor 718 to obtain an adjusted dynamic noise floor 720. In some examples, the classifier may modify the dynamic noise floor 718 based, at least in part, on properties of the received signal 712 and/or an active pulse. For example, the classifier may shift and/or scale the dynamic noise floor 720 based, at least in part, on a width and/or a height of the received signal 712. In some examples, the classifier may scale the dynamic noise floor by a scale factor based, at least in part, on the maximum magnitude of the received signal 712.

In some examples, the classifier may additionally or alternatively adjust the noise floor based, at least in part, on a temperature of the light sensor and/or the LIDAR system, the transmit power, a SNR, a noise power, a comparison of the transmit power to the received signal power, etc. For example, the classifier may shift the dynamic noise floor 718 up based, at least in part, on determining that at least a portion of the received signal 712 has a power that exceeds the transmit power (e.g., sunlight may have hit the light sensor). In some examples, the dynamic noise floor 718 is shifted by a factor determined such that at least some of the magnitudes of a true positive active pulse 714 are between two and three times a magnitude of the adjusted dynamic noise floor 720. This factor may be determined based, at least in part, on historical active pulses and/or transmit power.

In some examples, the classifier may classify at least a portion of the received signal 712 as an active pulse 714 based, at least in part, on a first threshold number (e.g., three or more) of samples exceeding the dynamic noise floor 718 and/or the adjusted dynamic noise floor 720. In some examples, the classifier may additionally or alternatively classify at least a portion of the received signal 712 as a saturated signal based, at least in part, on a second threshold number of samples exceeding the dynamic noise floor 718 and/or the adjusted dynamic noise floor 720 and/or determining that a third threshold number of sequential samples that exceed the dynamic noise floor 718 and/or the adjusted dynamic noise floor 720 are within a variance of each other. For example, the classifier might determine that three samples exceed the adjusted noise floor and may therefore identify those samples and every sample following the three samples as an active pulse until the classifier identifies a sample that does not exceed the adjusted noise floor. Of the samples identified as the active pulse, the classifier may determine that the active pulse is a saturated pulse based, at least in part, on determining that the number of samples making up the active pulse equals or exceeds five samples and/or based, at least in part, on determining that the samples making up the active pulse include at least three sequential samples that are associated with magnitudes that are within ±2 of each other.

References herein to a "threshold magnitude," unless explicitly defined as a static threshold magnitude, may include the magnitude defined by the dynamic noise floor 718 and/or the adjusted dynamic noise floor 720.

Example System Architecture

Figure 8:
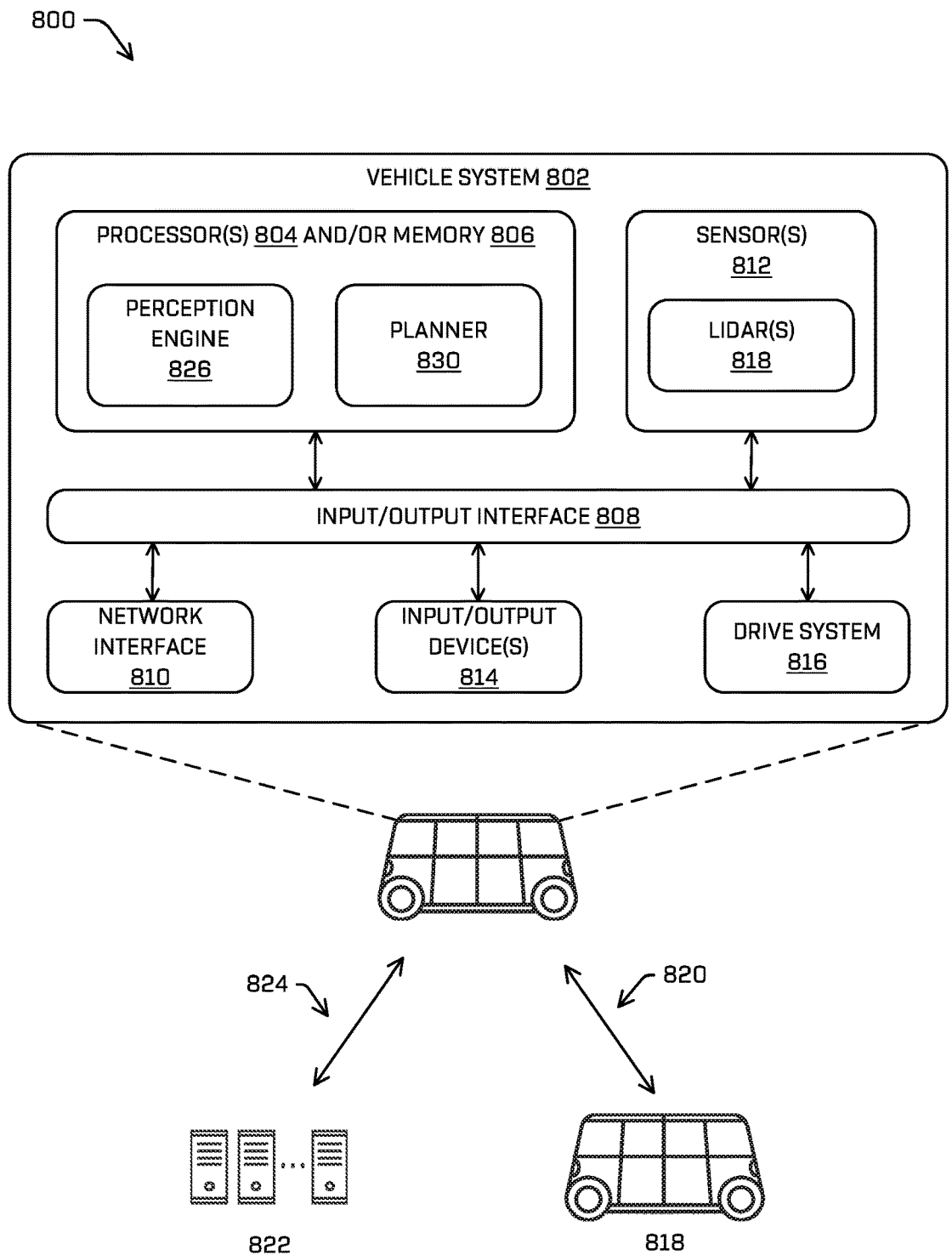
FIG. 8 illustrates a block diagram of an example autonomous vehicle that may incorporate the LIDAR system discussed herein.

FIG. 8 is a block diagram of an example architecture 800 including an example vehicle system 802 for controlling operation of at least one vehicle, such as an autonomous vehicle, using distances determined by a LIDAR system, according to any of the techniques discussed herein.

In some examples, the vehicle system 802 may include processor(s) 804 and/or memory 806. These elements are illustrated in combination in FIG. 8, although it is understood that they may be separate elements of the vehicle system 802, and that components of the system may be implemented as hardware and/or software, in some examples.

Processor(s) 804 may include a uniprocessor system including one processor, or a multiprocessor system including several processors (e.g., two, four, eight, or another suitable number). The processor(s) 804 may be any suitable processor capable of executing instructions. For example, in various implementations, the processor(s) 804 may be general-purpose or embedded processors implementing any of a variety of instruction set architectures (ISAs), such as the x86, PowerPC, SPARC, or MIPS ISAs, or any other suitable ISA. In multiprocessor systems, each processor 804 may commonly, but not necessarily, implement the same ISA. In some examples, the processor(s) 804 may include a central processing unit (CPU), a graphics processing unit (GPU), FPGA, Application Specific Integrated Circuit (ASIC), or a combination thereof. In some examples, the classifier and/or one or more of the detectors discussed herein may be implemented using any of these processor architectures. For example, the classifier and/or the one or more detectors may be FPGAs.

The example vehicle system 802 may include memory 806. In some examples, the memory 806 may include a non-transitory computer readable media configured to store executable instructions/modules, data, and/or data items accessible by the processor(s) 804. In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated example, program instructions and data implementing desired operations, such as those described above, are shown stored within the non-transitory computer readable memory. In other implementations, program instructions, and/or data may be received, sent, or stored on different types of computer-accessible media, such as non-transitory computer readable media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the example vehicle system 802 via an input/output ("I/O") interface 808. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface 810.

Furthermore, though illustrated as a single unit in FIG. 8, it is understood that the processor(s) 804 and memory 806 may be distributed among multiple computing devices of the vehicle and/or among multiple vehicles, data centers, teleoperation centers, etc. In some examples, the processor(s) 804 and memory 806 may conduct at least some of the techniques discussed herein and the processor(s) 804 and memory 806 may include processor(s) and memory of the LIDAR system discussed herein.

In some examples, the input/output ("I/O") interface 808 may be configured to coordinate I/O traffic between the processor(s) 804, the memory 806, the network interface 810, sensor(s) 812, I/O devices 814, drive system 816, and/or any other hardware of the vehicle system 802. In some examples, the I/O devices 814 may include external and/or internal speaker(s), display(s), passenger input device(s), etc. In some examples, the I/O interface 808 may perform protocol, timing, or other data transformations to convert data signals from one component (e.g., the non-transitory computer readable media) into a format suitable for use by another component (e.g., processor(s)). In some examples, the I/O interface 808 may include support for devices attached through various types of peripheral buses, such as the Peripheral Component Interconnect (PCI) bus standard, the Universal Serial Bus (USB) standard, or a variant thereof, for example. In some implementations, the function of the I/O interface 808 may be split into two or more separate components, such as a north bridge and a south bridge, for example. Also, in some examples, some or all of the functionality of the I/O interface 808, such as an interface to the memory 806, may be incorporated directly into the processor(s) 804 and/or one or more other components of the vehicle system 802.

The example vehicle system 802 may include a network interface 810 configured to establish a communication link (i.e., "network") between the vehicle system 802 and one or more other devices. For example, the network interface 810 may be configured to allow data to be exchanged between the vehicle system 802 and another vehicle 818 via a first network 820, and/or between the vehicle system 802 and a remote computing system 822 via a second network 824. For example, the network interface 810 may enable wireless communication between another vehicle 818 and/or the remote computing device 822. In various implementations, the network interface 810 may support communication via wireless general data networks, such as a Wi-Fi network, and/or telecommunications networks, such as, for example, cellular communication networks, satellite networks, and the like. In some examples, the sensor data discussed herein, such as a received signal, TDOA, selected distance, estimated distance, received signal height and/or width, etc., may be received at a first vehicle and transmitted to a second vehicle. In some examples, at least some of the components of the LIDAR may be located at different devices. For example, a first vehicle may include the light emitter and light sensor and may generate the received signal, but may transmit the received signal to a second vehicle and/or remote computing device where the classifier and/or one or more of the detectors is additionally or alternatively located.

The example vehicle system 802 may include sensor(s) 812, for example, configured to localize the vehicle system 802 in an environment, to detect one or more objects in the environment, to sense movement of the example vehicle system 802 through its environment, sense environmental data (e.g., ambient temperature, pressure, and humidity), and/or sense conditions of an interior of the example vehicle system 802 (e.g., passenger count, interior temperature, noise level). The sensor(s) 812 may include, for example, one or more LIDAR sensors 818, which may represent the example system 100 and/or components thereof; one or more cameras (e.g. RGB-cameras; intensity (grey scale) cameras; infrared cameras; depth cameras; stereo cameras); one or more magnetometers; one or more radar sensors; one or more sonar sensors; one or more microphones for sensing sounds; one or more IMU sensors (e.g., including accelerometers and gyroscopes); one or more GPS sensors; one or more Geiger counter sensors; one or more wheel encoders; one or more drive system sensors; a speed sensor; and/or other sensors related to the operation of the example vehicle system 802.

In some examples, although the LIDAR(s) 818 are depicted as discrete sensor(s) in FIG. 8, at least one of the components of the LIDAR(s) 818 (e.g., the components discussed in FIG. 1, FIG. 4, etc.) may be separate from the LIDAR(s) 818. For example, the processor(s) 804 and/or the memory 806 may include the programming and/or circuitry of the classifier and/or one or more of the detectors, as discussed herein.

In some examples, the example vehicle system 802 may include a perception engine 826 and a planner 830.

The perception engine 826 may include instructions stored on memory 806 that, when executed by the processor(s) 804, configure the processor(s) 804 to receive sensor data from the sensor(s) 812 as input, which may include an estimated distance and/or selected distance determined by the LIDAR system discussed herein, and output data representative of, for example. In some examples, the perception engine 826 may include instructions stored on memory 806 that, when executed by the processor(s) 804, configure the processor(s) 804 to determine a cloud of LIDAR points based, at least in part, on estimated distances and/or selected distances determined according to any of the techniques discussed herein. In some examples, the perception engine 826 may use the LIDAR point cloud to determine one or more of a representation of the environment surrounding the example vehicle system 802, the pose (e.g. position and orientation) of an object in the environment surrounding the example vehicle system 802, an object track associated with the object (e.g., a historic position, velocity, acceleration, and/or heading of the object over a period of time (e.g. 5 seconds)), and/or an object classification associated with the object (e.g. a pedestrian, a vehicle, a bicyclist, etc.). In some examples, perception engine 826 may be configured to predict more than an object trajectory of one or more objects. For example, the perception engine 826 may be configured to predict multiple object trajectories based on, for example, probabilistic determinations or multimodal distributions of predicted positions, trajectories, and/or velocities associated with an object detected from the LIDAR point cloud.

In some examples, the planner 830 may receive the LIDAR point cloud and/or any other additional information (e.g., object classifications, object tracks, vehicle pose) and use this information to generate a trajectory for controlling motion of the vehicle 802.

Example Clauses

A. A non-transitory computer-readable medium storing instructions that, when executed, cause one or more processors to perform operations comprising: causing a light emitter to emit a light pulse into an environment of the light emitter; receiving a signal indicating receipt, at a light sensor, of reflected light reflected from an object in the environment, the signal being saturated; determining a distance to the object based, at least in part, on a time delay of arrival (TDOA) between emitting the light pulse and a time associated with a rising edge of the signal, wherein determining the TDOA includes: identifying a max sample of the signal associated with a maximum magnitude of the signal, the max sample being a first sample in a series of samples of the signal having the maximum magnitude; fitting a first polynomial curve to the sample and at least two additional samples, the two additional samples including a sample preceding the max sample and a sample following the max sample in the series; defining an intermediate threshold magnitude based, at least in part, on a maximum value of the first polynomial curve; determining at least two intermediate samples of the signal that are most proximate to the intermediate threshold magnitude along a rising edge of the signal; fitting a second polynomial curve to the at least two intermediate samples; determining an intersection of the second polynomial curve with the intermediate threshold magnitude, the intersection indicating the rising edge of the signal.

B. The non-transitory computer-readable medium as paragraph A recites, the operations further comprising: receiving an emission time indicating when the light emitter emitted the light; determining a fractional sample index associated with the intersection; determining the TDOA between the emission time and a time associated with the fractional sample index; and calculating the distance based, at least in part, on the TDOA.

C. The non-transitory computer-readable medium as paragraph A recites, wherein the intermediate threshold magnitude is a percentage between 40 and 80% of the maximum value of the first polynomial curve.

D. The non-transitory computer-readable medium as paragraph A recites, wherein the first polynomial curve is associated with a second-degree or third-degree polynomial function and the second polynomial curve is associated with a different second-degree or different third-degree polynomial function.

E. A computer-implemented method comprising: emitting a pulse of light from a light emitter, the light pulse reflecting off an object in an environment creating a reflected pulse; receiving the reflected pulse at a light detector; generating, based, at least in part, on the reflected pulse, a signal, the signal comprising a series of samples; determining the signal as saturated; determining a maximum magnitude of the signal and a first sample in the series that indicates the maximum magnitude; fitting a first polynomial curve to the first sample and at least two additional samples in the series, the two additional samples including a sample preceding the first sample and a sample following the first sample in the series; defining an intermediate threshold magnitude based, at least in part, on the first polynomial curve; determining at least three intermediate samples having values that are proximate to the intermediate threshold magnitude; fitting a second polynomial curve to the at least three intermediate samples; determining a sample index that corresponds to an intersection of the second polynomial curve with the intermediate threshold magnitude; and determining a distance based, at least in part, on the sample index.

F. The computer-implemented method as paragraph E recites, further comprising: receiving a time at which a light pulse was emitted by a light emitter, wherein determining the distance includes determining a delay between the time and the sample index that corresponds to the intersection.

G. The computer-implemented method as paragraph E recites, further comprising: determining that the signal is saturated based, at least in part, on a magnitude associated with one or more samples of the signal meeting or exceeding a threshold magnitude.

H. The computer-implemented method as paragraph G recites, wherein the threshold magnitude is defined by a noise floor that is dynamically adjusted based, at least in part, on at least one property of the saturated pulse.

I. The computer-implemented method as paragraph E recites, further comprising determining a width from the first sample to a last sample in a series of samples that meet or exceed a predetermined value.

J. The computer-implemented method as paragraph E recites, further comprising determining a width from a first point of a rising edge of the signal that intersects the intermediate threshold to a second point of a falling edge of the signal that intersects the intermediate threshold magnitude.

K. The computer-implemented method as paragraph J recites, further comprising: determining a distance offset based, at least in part, on the width; and outputting a corrected distance based, at least in part, on modifying the distance by the distance offset.

L. The computer-implemented method as paragraph E recites, wherein: the intermediate threshold maximum is a fraction of the maximum value of the first polynomial curve, and the sample index is interpolated.

M. The computer-implemented method as paragraph E recites, wherein defining the intermediate threshold magnitude includes determining a value of the first polynomial curve at a point on the first polynomial curve corresponding to the first sample.

N. The computer-implemented method as paragraph E recites, wherein defining the intermediate threshold magnitude includes determining a maximum value of the first polynomial curve.

O. A system comprising: a light emitter; a light sensor; one or more processors; and one or more computer-readable media storing instructions executable by the one or more processors, wherein the instructions program the one or more processors to: receive a signal indicative of light received at the light sensor, the signal being discretized into a series of samples; determine a first sample of the series of samples having a maximum magnitude; fit a first polynomial curve to the first sample and at least a sample preceding the first sample in the series and a sample following the first sample in the series; define an intermediate threshold magnitude based, at least in part, on the first polynomial curve; identify three or more intermediate samples of the signal that are proximate to a first intersection of the signal and the intermediate threshold magnitude; fit a second polynomial curve to the three or more intermediate samples; and determine a second intersection of the second polynomial curve and the intermediate threshold magnitude and a time corresponding to the intersection, the second intersection indicating a rising edge of the signal.

P. The system as paragraph O recites, further comprising a clock that outputs a reference signal; and wherein the instructions further program the one or more processors to: receive an emission time associated with emitting the light pulse; interpolate the series of samples of the signal to determine an intersection time of the samples with the second intersection; determine a change in time from the emission time to the intersection time; and determine a distance based, at least in part, on the change in time.

Q. The system as paragraph O recites, wherein the intermediate threshold magnitude is one value in a range between 50% and 70% of the maximum value of the first polynomial curve.

R. The system as paragraph O recites, being embodied in an autonomous vehicle, the autonomous vehicle configured to generate a trajectory for controlling the autonomous vehicle based, at least in part, on the distance.

S. The system as paragraph O recites, further including an analog-to-digital converter configured to: receive a current indicative of light received at the light sensor, and convert the current to the signal; and wherein: the light sensor includes a photodiode; and the instructions further program the one or more processors to determine that the signal includes a saturated pulse based, at least in part, on determining that a magnitude associated with one or more samples of the signal exceeds a threshold magnitude.

T. The system as paragraph O recites, the instructions further program the one or more processors to filter the signal to obtain a smoothed signal and wherein the determining the first sample of the series of samples is determined before filtering the signal and fitting the first polynomial curve, defining the intermediate threshold magnitude, identifying the three or more intermediate samples, fitting the second polynomial curve, and determining the second intersection are based, at least in part, on the smoothed signal.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously, in reverse order, with additional operations, or omitting operations, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. One or more non-transitory computer-readable media storing instructions that, when executed, cause one or more processors to perform operations comprising:
    receiving, from a light sensor, a signal indicating light reflected from an object in an environment, the signal defined by a series of samples;
    determining a distance to the object based, at least in part, on a time delay of arrival (TDOA) between emitting a light pulse and a time associated with a rising edge of the signal, wherein determining the TDOA includes:
        identifying, from among the series of samples, a maximum sample, wherein the maximum sample comprises an earliest received sample associated with a maximum magnitude of the signal;
        fitting a first polynomial curve to at least the maximum sample;
        defining an intermediate threshold magnitude based, at least in part, on the first polynomial curve;
        fitting a second polynomial curve to at least two intermediate samples proximate to the intermediate threshold magnitude; and
        determining, based at least in part on a sample index associated with an intersection of the second polynomial curve with the intermediate threshold magnitude, the TDOA.

2. The one or more non-transitory computer-readable media of claim 1, wherein fitting the first polynomial curve to the maximum sample comprises fitting the first polynomial curve to the maximum sample and to at least a sample proximate the maximum sample in the series.

3. The one or more non-transitory computer-readable media of claim 1, wherein fitting the first polynomial curve to the maximum sample comprises fitting the first polynomial curve to the maximum sample and to at least a sample preceding the maximum sample in the series and a sample following the maximum sample in the series.

4. The one or more non-transitory computer-readable media of claim 1, wherein the at least two intermediate samples are along the rising edge of the signal.

5. The one or more non-transitory computer-readable media of claim 1, wherein the sample index includes a fractional sample index.

6. The one or more non-transitory computer-readable media of claim 1, wherein the intermediate threshold magnitude is a percentage between 40 and 80% of a maximum value of the first polynomial curve.

7. The one or more non-transitory computer-readable media of claim 1, wherein the first polynomial curve is associated with a second-degree or third-degree polynomial function and the second polynomial curve is associated with a different second-degree or different third-degree polynomial function.

8. The one or more non-transitory computer-readable media of claim 1, the operations further comprising:
    determining that the signal is saturated based, at least in part, on a magnitude associated with the series of samples meeting or exceeding a threshold magnitude.

9. A method comprising:
    receiving a signal indicative of light received by a light sensor, the signal comprising a series of samples;
    determining a maximum magnitude of the signal and a first sample in the series associated with the maximum magnitude;
    fitting a first polynomial curve to the first sample and a sample proximate the first sample;
    defining an intermediate threshold magnitude based, at least in part, on the first polynomial curve;
    fitting a second polynomial curve to at least two intermediate samples proximate to the intermediate threshold magnitude;
    determining a sample index that corresponds to an intersection of the second polynomial curve with the intermediate threshold magnitude; and
    determining a distance based, at least in part, on the sample index.

10. The method of claim 9, wherein the at least two intermediate samples are along a rising edge of the signal.

11. The method of claim 9, wherein the sample index includes a fractional sample index.

12. The method of claim 9, wherein the intermediate threshold magnitude is a percentage between 40 and 80% of a maximum value of the first polynomial curve.

13. The method of claim 9, wherein the first polynomial curve is associated with a second-degree or third-degree polynomial function and the second polynomial curve is associated with a different second-degree or different third-degree polynomial function.

14. The method of claim 9, further comprising:
   determining that the signal is saturated based, at least in part, on a magnitude associated with the series of samples meeting or exceeding a threshold magnitude.

15. A system comprising:
   a light sensor;
   control circuitry communicatively coupled to the light sensor, the control circuitry being configured to perform operations comprising:
      receive a signal indicative of light received at the light sensor, the signal being discretized into a series of samples;
      determine a first sample of the series of samples having a maximum magnitude;
      fit a first polynomial curve to the first sample and a sample proximate the first sample in the series;
      define an intermediate threshold magnitude based, at least in part, on the first polynomial curve; and
      determine a time delay of arrival (TDOA) based on the intermediate threshold magnitude.

16. The system of claim 15, wherein the intermediate threshold magnitude is a percentage between 40 and 80% of a maximum value of the first polynomial curve.

17. The system of claim 15, wherein the operations further comprise:
   determine that the signal is saturated based, at least in part, on a magnitude associated with the series of samples meeting or exceeding a threshold magnitude.

18. The system of claim 15, wherein the operations further comprise:
   identify three or more intermediate samples of the signal that are proximate to a first intersection of the signal and the intermediate threshold magnitude;
   fit a second polynomial curve to the three or more intermediate samples; and
   determine a second intersection of the second polynomial curve and the intermediate threshold magnitude and a time corresponding to the second intersection, wherein the TDOA is based on the time.

19. The system of claim 18, wherein the three or more intermediate samples are along a rising edge of the signal.

20. The system of claim 18, wherein the first polynomial curve is associated with a second-degree or third-degree polynomial function and the second polynomial curve is associated with a different second-degree or different third-degree polynomial function.

* * * * *